(12) United States Patent  (10) Patent No.: US 8,467,651 B2
Cao et al.  (45) Date of Patent: Jun. 18, 2013

(54) FIBER OPTIC TERMINALS CONFIGURED TO DISPOSE A FIBER OPTIC CONNECTION PANEL(S) WITHIN AN OPTICAL FIBER PERIMETER AND RELATED METHODS

(75) Inventors: Songhua Cao, Shanghai (CN); Guy J. Castonguay, Shanghai (CN); Bin Dai, Shanghai (CN)

(73) Assignee: CCS Technology Inc., Wilmington, DE (US)

( * ) Notice: Subject to any disclaimer, the term of this patent is extended or adjusted under 35 U.S.C. 154(b) by 344 days.

(21) Appl. No.: 12/892,280

(22) Filed: Sep. 28, 2010

(65) Prior Publication Data

US 2011/0075968 A1   Mar. 31, 2011

Related U.S. Application Data

(60) Provisional application No. 61/247,465, filed on Sep. 30, 2009.

(51) Int. Cl.
  *G02B 6/36* (2006.01)
(52) U.S. Cl.
  USPC ........................................................ 385/135
(58) Field of Classification Search
  None
  See application file for complete search history.

(56) References Cited

U.S. PATENT DOCUMENTS

| | | | |
|---|---|---|---|
| 1,280,393 A | 10/1918 | Cannon | |
| 1,703,255 A | 2/1929 | Wagner | |
| 2,003,147 A | 5/1935 | Holm-Hansen | |
| 2,044,073 A | 6/1936 | Hurley | |
| 2,428,149 A | 9/1947 | Falk | |
| 2,984,488 A | 5/1961 | Kirchner | |
| 3,054,994 A | 9/1962 | Haram | |
| 3,204,867 A | 9/1965 | Wahlbom | |
| 3,880,390 A | 4/1975 | Niven | |
| 4,006,540 A | 2/1977 | Lemelson | |
| 4,012,010 A | 3/1977 | Friedman | |
| 4,073,560 A | 2/1978 | Anhalt et al. | |

(Continued)

FOREIGN PATENT DOCUMENTS

| | | |
|---|---|---|
| DE | 4130706 A1 | 3/1993 |
| DE | 4133375 C1 | 4/1993 |

(Continued)

OTHER PUBLICATIONS

Notice of Allowance for U.S. Appl. No. 11/595,723 mailed Dec. 28, 2010, 8 pages.

(Continued)

*Primary Examiner* — Mike Stahl
(74) *Attorney, Agent, or Firm* — John H. Vynalek

(57) ABSTRACT

Fiber optic terminals and methods for establishing optical connections are disclosed. In one embodiment, a fiber optic terminal is provided that includes a base defining an interior chamber. The fiber optic terminal includes a terminal cover configured to close onto the base. A plurality of fiber routing guides are disposed in the base defining an optical fiber perimeter in the interior chamber. At least one fiber optic connection panel is disposed in the fiber optic terminal for establishing optical connections. The fiber optic connection panel is disposed on the internal surface of the terminal cover such that when the terminal cover is closed, the fiber optic connection panel is disposed within the optical fiber perimeter. In this manner, routing of optical fibers around the optical fiber perimeter provides space for disposing the fiber optic connection panel in the fiber optic terminal when the terminal cover is closed.

28 Claims, 11 Drawing Sheets

U.S. PATENT DOCUMENTS

| | | | |
|---|---|---|---|
| 4,123,012 | A | 10/1978 | Hough |
| 4,177,961 | A | 12/1979 | Gruenewald |
| 4,210,380 | A | 7/1980 | Brzostek |
| D257,613 | S | 12/1980 | Gruenewald |
| 4,244,544 | A | 1/1981 | Kornat |
| 4,261,529 | A | 4/1981 | Sandberg et al. |
| 4,261,644 | A | 4/1981 | Giannaris |
| 4,480,449 | A | 11/1984 | Getz et al. |
| 4,497,457 | A | 2/1985 | Harvey |
| 4,502,754 | A | 3/1985 | Kawa |
| 4,506,698 | A | 3/1985 | Garcia et al. |
| 4,524,384 | A | 6/1985 | Lefkowitz et al. |
| D281,574 | S | 12/1985 | O'Hara, II |
| 4,579,310 | A | 4/1986 | Wells et al. |
| 4,586,675 | A | 5/1986 | Brown |
| 4,611,887 | A | 9/1986 | Glover et al. |
| 4,736,100 | A | 4/1988 | Vastagh |
| 4,747,020 | A | 5/1988 | Brickley et al. |
| 4,778,125 | A | 10/1988 | Hu |
| 4,806,814 | A | 2/1989 | Nold |
| 4,810,054 | A | 3/1989 | Shinbori et al. |
| 4,824,193 | A | 4/1989 | Maeda et al. |
| 4,836,479 | A | 6/1989 | Adams |
| 4,844,573 | A | 7/1989 | Gillham et al. |
| 4,884,863 | A | 12/1989 | Throckmorton |
| 4,900,118 | A | 2/1990 | Yanagawa et al. |
| 4,900,123 | A | 2/1990 | Barlow et al. |
| 4,948,220 | A | 8/1990 | Violo et al. |
| 4,961,623 | A | 10/1990 | Midkiff et al. |
| 4,979,749 | A | 12/1990 | Onanian |
| 4,995,688 | A | 2/1991 | Anton et al. |
| 5,023,646 | A | 6/1991 | Ishida et al. |
| 5,048,916 | A | 9/1991 | Caron |
| 5,048,926 | A | 9/1991 | Tanimoto |
| 5,066,149 | A | 11/1991 | Wheeler et al. |
| 5,071,211 | A | 12/1991 | Debortoli et al. |
| 5,071,220 | A | 12/1991 | Ruello et al. |
| 5,073,042 | A | 12/1991 | Mulholland et al. |
| 5,074,635 | A | 12/1991 | Justice et al. |
| 5,076,688 | A | 12/1991 | Bowen et al. |
| 5,085,384 | A | 2/1992 | Kasubke |
| 5,112,014 | A | 5/1992 | Nichols |
| D327,312 | S | 6/1992 | Myojo |
| 5,142,598 | A | 8/1992 | Tabone |
| D330,368 | S | 10/1992 | Bourgeois et al. |
| 5,189,410 | A | 2/1993 | Kosugi et al. |
| 5,204,929 | A | 4/1993 | Machall et al. |
| 5,209,441 | A | 5/1993 | Satoh |
| 5,214,735 | A | 5/1993 | Henneberger et al. |
| 5,218,664 | A | 6/1993 | O'Neill et al. |
| 5,231,687 | A | 7/1993 | Handley |
| 5,233,674 | A | 8/1993 | Vladic |
| 5,243,679 | A | 9/1993 | Sharrow et al. |
| 5,255,161 | A | 10/1993 | Knoll et al. |
| 5,260,957 | A | 11/1993 | Hakimi et al. |
| 5,265,187 | A | 11/1993 | Morin et al. |
| 5,274,731 | A | 12/1993 | White |
| 5,287,428 | A | 2/1994 | Shibata |
| 5,317,663 | A | 5/1994 | Beard et al. |
| 5,323,480 | A | 6/1994 | Mullaney et al. |
| 5,333,221 | A | 7/1994 | Briggs et al. |
| 5,333,222 | A | 7/1994 | Belenkiy et al. |
| 5,348,240 | A | 9/1994 | Carmo et al. |
| 5,359,688 | A | 10/1994 | Underwood |
| 5,363,465 | A | 11/1994 | Korkowski et al. |
| 5,367,598 | A | 11/1994 | Devenish, III et al. |
| 5,375,185 | A | 12/1994 | Hermsen et al. |
| 5,383,051 | A | 1/1995 | Delrosso et al. |
| 5,402,515 | A | 3/1995 | Vidacovich et al. |
| 5,408,557 | A | 4/1995 | Hsu |
| RE34,955 | E | 5/1995 | Anton et al. |
| 5,420,956 | A | 5/1995 | Grugel et al. |
| 5,420,958 | A | 5/1995 | Henson et al. |
| 5,428,705 | A | 6/1995 | Hermsen et al. |
| 5,432,875 | A | 7/1995 | Korkowski et al. |
| 5,438,641 | A | 8/1995 | Malacarne |
| 5,442,726 | A | 8/1995 | Howard et al. |
| 5,448,015 | A | 9/1995 | Jamet et al. |
| 5,460,342 | A | 10/1995 | Dore et al. |
| 5,473,115 | A | 12/1995 | Brownlie et al. |
| 5,479,553 | A | 12/1995 | Daems et al. |
| 5,490,229 | A | 2/1996 | Ghandeharizadeh et al. |
| 5,497,444 | A | 3/1996 | Wheeler |
| 5,515,472 | A | 5/1996 | Mullaney et al. |
| 5,542,015 | A | 7/1996 | Hultermans |
| 5,548,678 | A | 8/1996 | Frost et al. |
| 5,553,183 | A | 9/1996 | Bechamps |
| 5,553,186 | A | 9/1996 | Allen |
| 5,556,060 | A | 9/1996 | Bingham et al. |
| 5,559,922 | A | 9/1996 | Arnett |
| 5,570,895 | A | 11/1996 | McCue et al. |
| 5,590,234 | A | 12/1996 | Pulido |
| 5,607,126 | A | 3/1997 | Cordola et al. |
| 5,613,030 | A | 3/1997 | Hoffer et al. |
| 5,617,501 | A | 4/1997 | Miller et al. |
| 5,627,925 | A | 5/1997 | Alferness et al. |
| 5,647,043 | A | 7/1997 | Anderson et al. |
| 5,649,042 | A | 7/1997 | Saito |
| 5,652,814 | A | 7/1997 | Pan et al. |
| 5,659,655 | A | 8/1997 | Pilatos |
| 5,689,605 | A | 11/1997 | Cobb et al. |
| 5,689,607 | A | 11/1997 | Vincent et al. |
| 5,692,299 | A | 12/1997 | Daems et al. |
| 5,694,511 | A | 12/1997 | Pimpinella et al. |
| 5,708,751 | A | 1/1998 | Mattei |
| 5,717,810 | A | 2/1998 | Wheeler |
| 5,724,469 | A | 3/1998 | Orlando |
| 5,731,546 | A | 3/1998 | Miles et al. |
| 5,734,776 | A | 3/1998 | Puetz |
| 5,751,882 | A | 5/1998 | Daems et al. |
| 5,758,004 | A | 5/1998 | Alarcon et al. |
| 5,764,843 | A | 6/1998 | Macken et al. |
| 5,774,612 | A | 6/1998 | Belenkiy et al. |
| 5,775,648 | A | 7/1998 | Metzger |
| 5,778,132 | A | 7/1998 | Csipkes et al. |
| 5,793,920 | A | 8/1998 | Wilkins et al. |
| 5,793,921 | A | 8/1998 | Wilkins et al. |
| 5,796,908 | A | 8/1998 | Vicory |
| 5,802,237 | A | 9/1998 | Pulido |
| 5,810,461 | A | 9/1998 | Ive et al. |
| 5,816,081 | A | 10/1998 | Johnston |
| 5,823,646 | A | 10/1998 | Arizpe et al. |
| 5,825,955 | A | 10/1998 | Ernst et al. |
| 5,825,961 | A | 10/1998 | Wilkins et al. |
| 5,832,162 | A | 11/1998 | Sarbell |
| 5,835,657 | A | 11/1998 | Suarez et al. |
| 5,835,658 | A | 11/1998 | Smith |
| 5,862,290 | A | 1/1999 | Burek et al. |
| 5,867,621 | A | 2/1999 | Luther et al. |
| 5,870,519 | A | 2/1999 | Jenkins et al. |
| 5,880,864 | A | 3/1999 | Williams et al. |
| 5,881,200 | A | 3/1999 | Burt |
| 5,883,995 | A | 3/1999 | Lu |
| 5,884,003 | A | 3/1999 | Cloud et al. |
| 5,892,877 | A | 4/1999 | Meyerhoefer |
| 5,909,526 | A | 6/1999 | Roth et al. |
| 5,930,425 | A | 7/1999 | Abel et al. |
| 5,945,633 | A | 8/1999 | Ott et al. |
| 5,956,439 | A | 9/1999 | Pimpinella |
| 5,956,444 | A | 9/1999 | Duda et al. |
| 5,969,294 | A | 10/1999 | Eberle et al. |
| 5,975,769 | A | 11/1999 | Larson et al. |
| 6,009,225 | A | 12/1999 | Ray et al. |
| 6,027,252 | A | 2/2000 | Erdman et al. |
| 6,044,193 | A | 3/2000 | Szentesi et al. |
| 6,059,215 | A | 5/2000 | Finnis |
| 6,061,492 | A | 5/2000 | Strause et al. |
| 6,065,968 | A | 5/2000 | Corliss |
| 6,079,881 | A | 6/2000 | Roth |
| D427,897 | S | 7/2000 | Johnston et al. |
| 6,129,221 | A | 10/2000 | Shaha |
| 6,149,315 | A | 11/2000 | Stephenson |
| 6,151,436 | A | 11/2000 | Burek et al. |
| 6,160,946 | A | 12/2000 | Thompson et al. |
| D436,027 | S | 1/2001 | Johnston et al. |
| 6,188,687 | B1 | 2/2001 | Mussman et al. |
| 6,188,825 | B1 | 2/2001 | Bandy et al. |

| Patent No. | Date | Inventor(s) |
|---|---|---|
| 6,192,180 B1 | 2/2001 | Kim et al. |
| 6,208,796 B1 | 3/2001 | Williams Vigliaturo |
| 6,215,938 B1 | 4/2001 | Reitmeier et al. |
| 6,226,111 B1 | 5/2001 | Chang et al. |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,243,526 B1 | 6/2001 | Garibay et al. |
| 6,259,851 B1 | 7/2001 | Daoud |
| 6,263,136 B1 | 7/2001 | Jennings et al. |
| 6,263,141 B1 | 7/2001 | Smith |
| 6,269,212 B1 | 7/2001 | Schiattone |
| 6,275,640 B1 | 8/2001 | Hunsinger et al. |
| 6,275,641 B1 | 8/2001 | Daoud |
| 6,278,829 B1 | 8/2001 | Buabbud et al. |
| 6,278,831 B1 | 8/2001 | Henderson et al. |
| 6,289,159 B1 | 9/2001 | Van Hees et al. |
| 6,292,614 B1 | 9/2001 | Smith et al. |
| 6,307,997 B1 | 10/2001 | Walters et al. |
| 6,307,998 B2 | 10/2001 | Williams Vigiaturo |
| 6,311,007 B1 | 10/2001 | Daoud |
| RE37,489 E | 1/2002 | Anton et al. |
| 6,343,313 B1 | 1/2002 | Salesky et al. |
| 6,347,888 B1 | 2/2002 | Puetz |
| 6,353,697 B1 | 3/2002 | Daoud |
| 6,359,228 B1 | 3/2002 | Strause et al. |
| 6,363,183 B1 | 3/2002 | Koh |
| 6,363,200 B1 | 3/2002 | Thompson et al. |
| 6,370,294 B1 | 4/2002 | Pfeiffer et al. |
| 6,385,381 B1 | 5/2002 | Janus et al. |
| 6,397,166 B1 | 5/2002 | Leung et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,424,782 B1 | 7/2002 | Ray |
| 6,425,694 B1 | 7/2002 | Szilagyi et al. |
| 6,427,035 B1 | 7/2002 | Mahony |
| 6,431,762 B1 | 8/2002 | Taira et al. |
| 6,434,313 B1 | 8/2002 | Clapp, Jr. et al. |
| 6,434,316 B1 | 8/2002 | Grois et al. |
| 6,438,310 B1 | 8/2002 | Lance et al. |
| D463,253 S | 9/2002 | Canty |
| 6,452,925 B1 | 9/2002 | Sistanizadeh et al. |
| 6,456,772 B1 | 9/2002 | Daoud |
| 6,464,402 B1 | 10/2002 | Andrews et al. |
| D466,087 S | 11/2002 | Cuny et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,991 B2 | 11/2002 | Sher |
| 6,496,640 B1 | 12/2002 | Harvey et al. |
| 6,499,608 B1 | 12/2002 | Sterling et al. |
| D468,996 S | 1/2003 | Sarkinen et al. |
| 6,507,691 B1 | 1/2003 | Hunsinger et al. |
| 6,532,332 B2 | 3/2003 | Solheid et al. |
| 6,535,682 B1 | 3/2003 | Puetz et al. |
| 6,539,155 B1 | 3/2003 | Broeng et al. |
| 6,539,160 B2 | 3/2003 | Battey et al. |
| 6,542,652 B1 | 4/2003 | Mahony |
| 6,542,688 B1 | 4/2003 | Battey et al. |
| 6,543,100 B1 | 4/2003 | Finley et al. |
| 6,554,485 B1 | 4/2003 | Beatty et al. |
| 6,556,738 B2 | 4/2003 | Pfeiffer et al. |
| 6,556,763 B1 | 4/2003 | Puetz et al. |
| 6,567,601 B2 | 5/2003 | Daoud et al. |
| 6,577,595 B1 | 6/2003 | Counterman |
| 6,577,801 B2 | 6/2003 | Broderick et al. |
| 6,579,014 B2 | 6/2003 | Melton et al. |
| 6,580,867 B2 | 6/2003 | Galaj et al. |
| 6,581,788 B1 | 6/2003 | Winig et al. |
| 6,591,051 B2 | 7/2003 | Solheid et al. |
| 6,594,434 B1 | 7/2003 | Davidson et al. |
| 6,597,670 B1 | 7/2003 | Tweedy et al. |
| 6,598,949 B2 | 7/2003 | Frazier et al. |
| 6,612,515 B1 | 9/2003 | Tinucci et al. |
| 6,614,953 B2 | 9/2003 | Strasser et al. |
| 6,614,974 B2 | 9/2003 | Elrefaie et al. |
| 6,614,980 B1 | 9/2003 | Mahony |
| 6,621,952 B1 | 9/2003 | Pi et al. |
| 6,621,975 B2 | 9/2003 | Laporte et al. |
| 6,625,374 B2 | 9/2003 | Holman et al. |
| 6,625,375 B1 | 9/2003 | Mahony |
| 6,631,237 B2 | 10/2003 | Knudsen et al. |
| 6,633,717 B1 | 10/2003 | Knight et al. |
| 6,640,028 B1 | 10/2003 | Schroll et al. |
| RE38,311 E | 11/2003 | Wheeler |
| 6,652,163 B2 | 11/2003 | Fajardo et al. |
| 6,654,536 B2 | 11/2003 | Battey et al. |
| 6,668,127 B1 | 12/2003 | Mahony |
| 6,710,366 B1 | 3/2004 | Lee et al. |
| 6,711,339 B2 * | 3/2004 | Puetz et al. .................. 385/135 |
| 6,741,784 B1 | 5/2004 | Guan |
| D491,286 S | 6/2004 | Winig et al. |
| D491,287 S | 6/2004 | Winig et al. |
| D491,449 S | 6/2004 | Winig et al. |
| 6,748,155 B2 | 6/2004 | Kim et al. |
| 6,760,531 B1 | 7/2004 | Solheid et al. |
| 6,766,094 B2 | 7/2004 | Smith et al. |
| D495,067 S | 8/2004 | Winig et al. |
| 6,778,752 B2 | 8/2004 | Laporte et al. |
| 6,792,191 B1 | 9/2004 | Clapp, Jr. et al. |
| 6,795,633 B2 | 9/2004 | Joseph, II |
| 6,801,695 B2 | 10/2004 | Lanier et al. |
| 6,802,724 B1 | 10/2004 | Mahony |
| 6,809,258 B1 | 10/2004 | Dang et al. |
| D498,005 S | 11/2004 | Winig et al. |
| 6,819,856 B2 | 11/2004 | Dagley et al. |
| 6,819,857 B2 | 11/2004 | Douglas et al. |
| 6,845,207 B2 | 1/2005 | Schray |
| 6,850,685 B2 | 2/2005 | Tinucci et al. |
| 6,865,334 B2 | 3/2005 | Cooke et al. |
| 6,870,734 B2 | 3/2005 | Mertesdorf et al. |
| 6,870,997 B2 | 3/2005 | Cooke et al. |
| 6,879,545 B2 | 4/2005 | Cooke et al. |
| 6,880,982 B2 | 4/2005 | Imamura |
| 6,885,798 B2 | 4/2005 | Zimmel |
| 6,920,273 B2 | 7/2005 | Knudsen |
| 6,920,274 B2 | 7/2005 | Rapp et al. |
| 6,925,241 B2 | 8/2005 | Bohle et al. |
| 6,925,852 B2 | 8/2005 | Susko |
| 6,934,451 B2 | 8/2005 | Cooke et al. |
| 6,946,605 B2 | 9/2005 | Levesque et al. |
| 6,968,107 B2 | 11/2005 | Belardi et al. |
| 6,983,095 B2 | 1/2006 | Reagan et al. |
| 6,986,608 B2 | 1/2006 | Choudhury et al. |
| 6,993,228 B2 | 1/2006 | Burke, Jr. et al. |
| 7,006,748 B2 | 2/2006 | Dagley et al. |
| 7,027,695 B2 | 4/2006 | Cooke et al. |
| 7,054,513 B2 | 5/2006 | Hertz et al. |
| 7,068,907 B2 | 6/2006 | Schray |
| 7,083,051 B2 | 8/2006 | Smith et al. |
| 7,110,654 B2 | 9/2006 | Dillat |
| 7,120,347 B2 | 10/2006 | Blackwell, Jr. et al. |
| 7,142,763 B2 | 11/2006 | Frohlich et al. |
| 7,155,106 B2 | 12/2006 | Cianciotto et al. |
| 7,171,121 B1 | 1/2007 | Skarica et al. |
| 7,181,142 B1 | 2/2007 | Xu et al. |
| 7,200,316 B2 | 4/2007 | Giraud et al. |
| 7,200,317 B2 | 4/2007 | Reagan et al. |
| 7,215,865 B2 | 5/2007 | Bellekens et al. |
| 7,218,828 B2 | 5/2007 | Feustel et al. |
| 7,245,811 B2 | 7/2007 | Takeda et al. |
| 7,260,302 B2 | 8/2007 | Caveney |
| 7,264,402 B2 | 9/2007 | Theuerkorn et al. |
| 7,266,283 B2 | 9/2007 | Kline et al. |
| 7,272,291 B2 | 9/2007 | Bayazit et al. |
| 7,274,852 B1 | 9/2007 | Smrha et al. |
| 7,289,731 B2 | 10/2007 | Thinguldstad |
| 7,298,951 B2 | 11/2007 | Smrha et al. |
| 7,302,153 B2 | 11/2007 | Thom |
| 7,310,471 B2 | 12/2007 | Bayazit et al. |
| 7,330,629 B2 | 2/2008 | Cooke et al. |
| 7,349,616 B1 | 3/2008 | Castonguay et al. |
| 7,406,241 B1 | 7/2008 | Opaluch et al. |
| 7,418,184 B1 | 8/2008 | Gonzales et al. |
| 7,421,182 B2 | 9/2008 | Bayazit et al. |
| 7,450,806 B2 | 11/2008 | Bookbinder et al. |

| | | |
|---|---|---|
| 7,460,757 B2 | 12/2008 | Hoehne et al. |
| 7,471,867 B2 | 12/2008 | Vogel et al. |
| 7,477,826 B2 | 1/2009 | Mullaney et al. |
| 7,522,805 B2 * | 4/2009 | Smith et al. ............ 385/135 |
| 7,609,967 B2 | 10/2009 | Hochbaum et al. |
| 7,613,376 B2 | 11/2009 | Wright et al. |
| 7,766,732 B2 | 8/2010 | Hauville |
| 7,769,265 B2 | 8/2010 | Cairns |
| 2002/0034290 A1 | 3/2002 | Pershan |
| 2002/0037136 A1 | 3/2002 | Wang et al. |
| 2002/0051616 A1 | 5/2002 | Battey et al. |
| 2002/0118929 A1 | 8/2002 | Brun et al. |
| 2002/0148846 A1 | 10/2002 | Luburic |
| 2002/0150372 A1 | 10/2002 | Schray |
| 2002/0181896 A1 | 12/2002 | McClellan et al. |
| 2003/0031419 A1 | 2/2003 | Simmons et al. |
| 2003/0063866 A1 | 4/2003 | Melton et al. |
| 2003/0063875 A1 | 4/2003 | Bickham et al. |
| 2003/0095774 A1 | 5/2003 | Bohme et al. |
| 2003/0103750 A1 | 6/2003 | Laporte et al. |
| 2003/0132685 A1 | 7/2003 | Sucharczuk et al. |
| 2003/0134541 A1 | 7/2003 | Johnsen et al. |
| 2003/0142946 A1 | 7/2003 | Saito et al. |
| 2003/0147597 A1 | 8/2003 | Duran |
| 2003/0174996 A1 | 9/2003 | Henschel et al. |
| 2003/0185535 A1 | 10/2003 | Tinucci et al. |
| 2003/0223725 A1 | 12/2003 | Laporte et al. |
| 2004/0001686 A1 | 1/2004 | Smith et al. |
| 2004/0013390 A1 | 1/2004 | Kim et al. |
| 2004/0042710 A1 | 3/2004 | Margalit et al. |
| 2004/0074852 A1 | 4/2004 | Knudsen et al. |
| 2004/0081404 A1 | 4/2004 | Elliott |
| 2004/0084465 A1 | 5/2004 | Luburic |
| 2004/0109660 A1 | 6/2004 | Liberty |
| 2004/0146266 A1 | 7/2004 | Solheid et al. |
| 2004/0150267 A1 | 8/2004 | Ferguson |
| 2004/0175090 A1 | 9/2004 | Vastmans et al. |
| 2004/0218970 A1 | 11/2004 | Caveney et al. |
| 2004/0228598 A1 | 11/2004 | Allen et al. |
| 2004/0240825 A1 | 12/2004 | Daoud et al. |
| 2004/0264873 A1 | 12/2004 | Smith et al. |
| 2005/0002633 A1 | 1/2005 | Solheid et al. |
| 2005/0123261 A1 | 6/2005 | Bellekens et al. |
| 2005/0129379 A1 | 6/2005 | Reagan et al. |
| 2005/0152306 A1 | 7/2005 | Bonnassieux et al. |
| 2005/0213921 A1 | 9/2005 | Mertesdorf et al. |
| 2005/0232565 A1 | 10/2005 | Heggestad et al. |
| 2005/0238290 A1 | 10/2005 | Choudhury et al. |
| 2005/0265683 A1 | 12/2005 | Cianciotto et al. |
| 2005/0276562 A1 | 12/2005 | Battey et al. |
| 2005/0281526 A1 | 12/2005 | Vongseng et al. |
| 2006/0029334 A1 | 2/2006 | Quinby et al. |
| 2006/0049941 A1 | 3/2006 | Hunter et al. |
| 2006/0072892 A1 | 4/2006 | Serrander et al. |
| 2006/0083461 A1 | 4/2006 | Takahashi et al. |
| 2006/0083468 A1 | 4/2006 | Kahle et al. |
| 2006/0093278 A1 | 5/2006 | Elkins, II et al. |
| 2006/0093301 A1 | 5/2006 | Zimmel et al. |
| 2006/0093303 A1 | 5/2006 | Reagan et al. |
| 2006/0098931 A1 | 5/2006 | Sibley et al. |
| 2006/0133753 A1 | 6/2006 | Nelson et al. |
| 2006/0153516 A1 | 7/2006 | Napiorkowski et al. |
| 2006/0153517 A1 | 7/2006 | Reagan et al. |
| 2006/0165364 A1 | 7/2006 | Frohlich et al. |
| 2006/0182407 A1 | 8/2006 | Caveney |
| 2006/0193590 A1 | 8/2006 | Puetz et al. |
| 2006/0210230 A1 | 9/2006 | Kline et al. |
| 2006/0215980 A1 | 9/2006 | Bayazit et al. |
| 2006/0251373 A1 | 11/2006 | Hodge et al. |
| 2006/0263029 A1 | 11/2006 | Mudd et al. |
| 2006/0269205 A1 | 11/2006 | Zimmel |
| 2006/0269206 A1 | 11/2006 | Zimmel |
| 2006/0275008 A1 | 12/2006 | Xin |
| 2006/0279423 A1 | 12/2006 | Nazari |
| 2006/0285807 A1 | 12/2006 | Lu et al. |
| 2007/0003204 A1 | 1/2007 | Makrides-Saravanos et al. |
| 2007/0003205 A1 | 1/2007 | Saravanos et al. |
| 2007/0023464 A1 | 2/2007 | Barkdoll et al. |
| 2007/0031099 A1 | 2/2007 | Herzog et al. |
| 2007/0031101 A1 | 2/2007 | Kline et al. |
| 2007/0047891 A1 | 3/2007 | Bayazit et al. |
| 2007/0047893 A1 | 3/2007 | Kramer et al. |
| 2007/0047894 A1 | 3/2007 | Holmberg et al. |
| 2007/0052531 A1 | 3/2007 | Mathews et al. |
| 2007/0104447 A1 | 5/2007 | Allen |
| 2007/0114339 A1 | 5/2007 | Winchester |
| 2007/0263962 A1 | 11/2007 | Kohda |
| 2007/0274718 A1 | 11/2007 | Bridges et al. |
| 2008/0131067 A1 | 6/2008 | Ugolini et al. |
| 2008/0145008 A1 | 6/2008 | Lewallen et al. |
| 2008/0259928 A1 | 10/2008 | Chen et al. |
| 2009/0060440 A1 | 3/2009 | Wright et al. |
| 2009/0097813 A1 | 4/2009 | Hill |
| 2009/0103865 A1 | 4/2009 | Del Rosso |
| 2009/0208210 A1 | 8/2009 | Trojer et al. |
| 2009/0245746 A1 | 10/2009 | Krampotich et al. |
| 2009/0263122 A1 | 10/2009 | Helkey et al. |
| 2009/0297111 A1 | 12/2009 | Reagan et al. |
| 2010/0183274 A1 | 7/2010 | Brunet et al. |

FOREIGN PATENT DOCUMENTS

| | | |
|---|---|---|
| DE | 10005294 A1 | 8/2001 |
| DE | 10238189 A1 | 2/2004 |
| DE | 202004011493 U1 | 9/2004 |
| DE | 202007012420 U1 | 10/2007 |
| EP | 0409390 A2 | 1/1991 |
| EP | 0415647 A2 | 3/1991 |
| EP | 0490644 A1 | 6/1992 |
| EP | 0541820 A1 | 5/1993 |
| EP | 0593927 A1 | 4/1994 |
| EP | 0720322 A2 | 7/1996 |
| EP | 0725468 A1 | 8/1996 |
| EP | 0828356 A2 | 3/1998 |
| EP | 0840153 A2 | 5/1998 |
| EP | 0928053 A2 | 7/1999 |
| EP | 1107031 A1 | 6/2001 |
| EP | 1120674 A1 | 8/2001 |
| EP | 1179745 A2 | 2/2002 |
| EP | 1203974 A2 | 5/2002 |
| EP | 1316829 A2 | 6/2003 |
| EP | 1944635 A2 | 7/2008 |
| EP | 1944886 A1 | 7/2008 |
| FR | 2748576 A1 | 11/1997 |
| GB | 2254163 A | 9/1992 |
| JP | 59107317 A | 6/1984 |
| JP | 6227312 A | 8/1994 |
| JP | 11125722 A | 5/1999 |
| JP | 11231163 A | 8/1999 |
| JP | 2001116968 A | 4/2001 |
| JP | 2004061713 A | 2/2004 |
| WO | 8805925 A1 | 8/1988 |
| WO | 8905989 A1 | 6/1989 |
| WO | 9507484 A1 | 3/1995 |
| WO | 9630791 A1 | 10/1996 |
| WO | 9725642 A1 | 7/1997 |
| WO | 9736197 A1 | 10/1997 |
| WO | 0221186 A1 | 3/2002 |
| WO | 02099528 A1 | 12/2002 |
| WO | 03009527 A2 | 1/2003 |
| WO | 03093889 A1 | 11/2003 |
| WO | 2004086112 A1 | 10/2004 |
| WO | 2005050277 A2 | 6/2005 |
| WO | 2005088373 A1 | 9/2005 |
| WO | 2006050505 A1 | 5/2006 |
| WO | 2006127457 A1 | 11/2006 |
| WO | 2006135524 A3 | 12/2006 |
| WO | 2007050515 A1 | 5/2007 |
| WO | 2007129953 A1 | 11/2007 |
| WO | 2008033997 A1 | 3/2008 |
| WO | 2008048935 A2 | 4/2008 |

OTHER PUBLICATIONS

Non-final Office Action for U.S. Appl. No. 11/595,723 mailed Jun. 21, 2010, 9 pages.

Non-final Office Action for U.S. Appl. No. 11/595,723 mailed Jan. 5, 2010 9 pages.

Advisory Action for U.S. Appl. No. 11/595,723 mailed Nov. 24, 2009, 3 pages.

Final Office Action for U.S. Appl. No. 11/595,723 mailed Jul. 8, 2009, 13 pages.
Non-final Office Action for U.S. Appl. No. 11/595,723 mailed Sep. 25, 2008, 13 pages.
Final Office Action for U.S. Appl. No. 11/595,723 mailed Apr. 11, 2008, 12 pages.
Non-final Office Action for U.S. Appl. No. 11/595,723 mailed Jun. 7, 2007 18 pages.
Examiner's Answer to Appeal Brief for U.S. Appl. No. 10/804,958 mailed Apr. 29, 2010, 13 pages.
Non-final Office Action for U.S. Appl. No. 10/804,958 mailed Jul. 22, 2009, 8 pages.
Final Office Action for U.S. Appl. No. 10/804,958 mailed Jun. 11, 2008, 9 pages.
Final Office Action for U.S. Appl. No. 10/804,958 mailed Oct. 9, 2007, 8 pages.
Non-final Office Action for U.S. Appl. No. 10/804,958 mailed Jun. 15, 2007, 7 pages.
Final Office Action for U.S. Appl. No. 10/804,958 mailed Nov. 3, 2006, 7 pages.
Non-final Office Action for U.S. Appl. No. 10/804,958 mailed Apr. 6, 2006, 7 pages.
Non-final Office Action for U.S. Appl. No. 10/804,958 mailed Sep. 21, 2005, 7 pages.
Notice of Allowance for U.S. Appl. No. 11/499,572 mailed Jul. 1, 2010, 7 pages.
Advisory Action for U.S. Appl. No. 11/499,572 mailed Jan. 27, 2010, 3 pages.
Final Office Action for U.S. Appl. No. 11/499,572 mailed Aug. 12, 2009, 9 pages.
Advisory Action for U.S. Appl. No. 11/499,572 mailed May 29, 2009, 3 pages.
Final Office Action for U.S. Appl. No. 11/499,572 mailed Dec. 26, 2008, 8 pages.
Non-final Office Action for U.S. Appl. No. 11/499,572 mailed Jun. 13, 2008, 7 pages.
Notice of Allowance for U.S. Appl. No. 12/012,144 mailed Feb. 10, 2009, 6 pages.
Non-final Office Action for U.S. Appl. No. 12/012,144 mailed Jul. 15, 2008, 5 pages.
Notice of Allowance for U.S. Appl. No. 11/712,168 mailed Apr. 21, 2010, 9 pages.
Notice of Allowance for U.S. Appl. No. 11/712,168 mailed Sep. 18, 2009, 9 pages.
Notice of Allowance for U.S. Appl. No. 11/712,168 mailed Jun. 1, 2009, 7 pages.
Notice of Allowance for U.S. Appl. No. 11/712,168 mailed Apr. 7, 2009, 9 pages.
Advisory Action for U.S. Appl. No. 11/712,168 mailed Oct. 20, 2008, 3 pages.
Final Office Action for U.S. Appl. No. 11/712,168 mailed Jul. 24, 2008, 11 pages.
Non-final Office Action for U.S. Appl. No. 11/712,168 mailed Oct. 9, 2007, 7 pages.
Advisory Action for U.S. Appl. No. 11/809,390 mailed Dec. 14, 2009, 2 pages.
Final Office Action for U.S. Appl. No. 11/809,390 mailed Sep. 25, 2009, 12 pages.
Non-final Office Action for U.S. Appl. No. 11/809,390 mailed Mar. 11, 2009, 9 pages.
Notice of Allowance for U.S. Appl. No. 11/809,390 mailed Nov. 18, 2008, 7 pages.
Non-final Office Action for U.S. Appl. No. 11/809,390 mailed Jul. 25, 2008, 10 pages.
Non-final Office Action for U.S. Appl. No. 11/439,070 mailed Jun. 17, 2009, 9 pages.
Non-final Office Action for U.S. Appl. No. 11/439,070 mailed Oct. 17, 2008, 13 pages.
Non-final Office Action for U.S. Appl. No. 11/439,070 mailed Jan. 11, 2008, 11 pages.
Non-final Office Action for U.S. Appl. No. 11/439,070 mailed May 16, 2007, 16 pages.
Examiner's Answer to Appeal Brief for U.S. Appl. No. 11/975,440 mailed Oct. 22, 2010, 17 pages.
Final Office Action for U.S. Appl. No. 11/975,440 mailed Mar. 8, 2010, 10 pages.
Non-final Office Action for U.S. Appl. No. 11/975,440 mailed Oct. 28, 2009, 7 pages.
Non-final Office Action for U.S. Appl. No. 11/975,440 mailed Jul. 10, 2009, 6 pages.
Notice of Allowance for U.S. Appl. No. 12/566,191 mailed May 24, 2011, 5 pages.
Final Office Action for U.S. Appl. No. 12/566,191 mailed Feb. 15, 2011, 8 pages.
Non-Final Office Action for U.S. Appl. No. 12/566,191 mailed Sep. 30, 2010, 8 pages.
Final Office Action for U.S. Appl. No. 12/229,810 mailed Jun. 9, 2011, 16 pages.
Non-final Office Action for U.S. Appl. No. 12/229,810 mailed Dec. 23, 2010, 16 pages.
Notice of Allowance for U.S. Appl. No. 12/417,250 mailed Nov. 9, 2011, 8 pages.
Non-final Office Action for U.S. Appl. No. 12/417,250 mailed Jun. 23, 2011, 9 pages.
Final Office Action for U.S. Appl. No. 12/417,250 mailed Mar. 3, 2011, 9 pages.
Non-final Office Action for U.S. Appl. No. 12/417,250 mailed Jul. 27, 2010, 11 pages.
Advisory Action for U.S. Appl. No. 12/697,628 mailed Mar. 1, 2012, 3 pages.
Final Office Action for U.S. Appl. No. 12/697,628 mailed Nov. 17, 2011, 15 pages.
Non-final Office Action for U.S. Appl. No. 12/697,628 mailed Apr. 6, 2011, 11 pages.
Advisory Action for U.S. Appl. No. 12/072,187 mailed Aug. 15, 2011, 2 pages.
Final Office Action for U.S. Appl. No. 12/072,187 mailed Jun. 3, 2011, 21 pages.
Non-final Office Action for U.S. Appl. No. 12/072,187 mailed Nov. 30, 2010, 17 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Quayle Action for U.S. Appl. No. 12/861,345 mailed Apr. 9, 2012, 6 pages.
Non-final Office Action for U.S. Appl. No. 12/861,345 mailed Dec. 15, 2011, 10 pages.
Non-final Office Action for U.S. Appl. No. 12/700,837 mailed Jan. 30, 2012, 7 pages.
Final Office Action for U.S. Appl. No. 12/474,866 mailed Jan. 31, 2012, 8 pages.
Non-final Office Action for U.S. Appl. No. 12/474,866 mailed Aug. 5, 2011, 9 pages.
International Search Report for PCT/US2009/066779, Aug. 27, 2010, 3 pages.
International Search Report for PCT/EP2009/000929, Apr. 27, 2009, 4 pages.
Final Office Action for U.S. Appl. No. 12/700,837 mailed Aug. 31, 2012, 10 pages.
International Search Report for PCT/US2007/023631, mailed Apr. 21, 2008, 2 pages.
International Search Report for PCT/US2008/000095 mailed Sep. 12, 2008, 5 pages.
International Search Report for PCT/US2008/002514 mailed Aug. 8, 2008, 2 pages.
International Search Report for PCT/US2008/006798 mailed Oct. 1, 2008, 2 pages.
Non-final Office Action for U.S. Appl. No. 13/083,110 mailed Dec. 12, 2012, 9 pages.

* cited by examiner

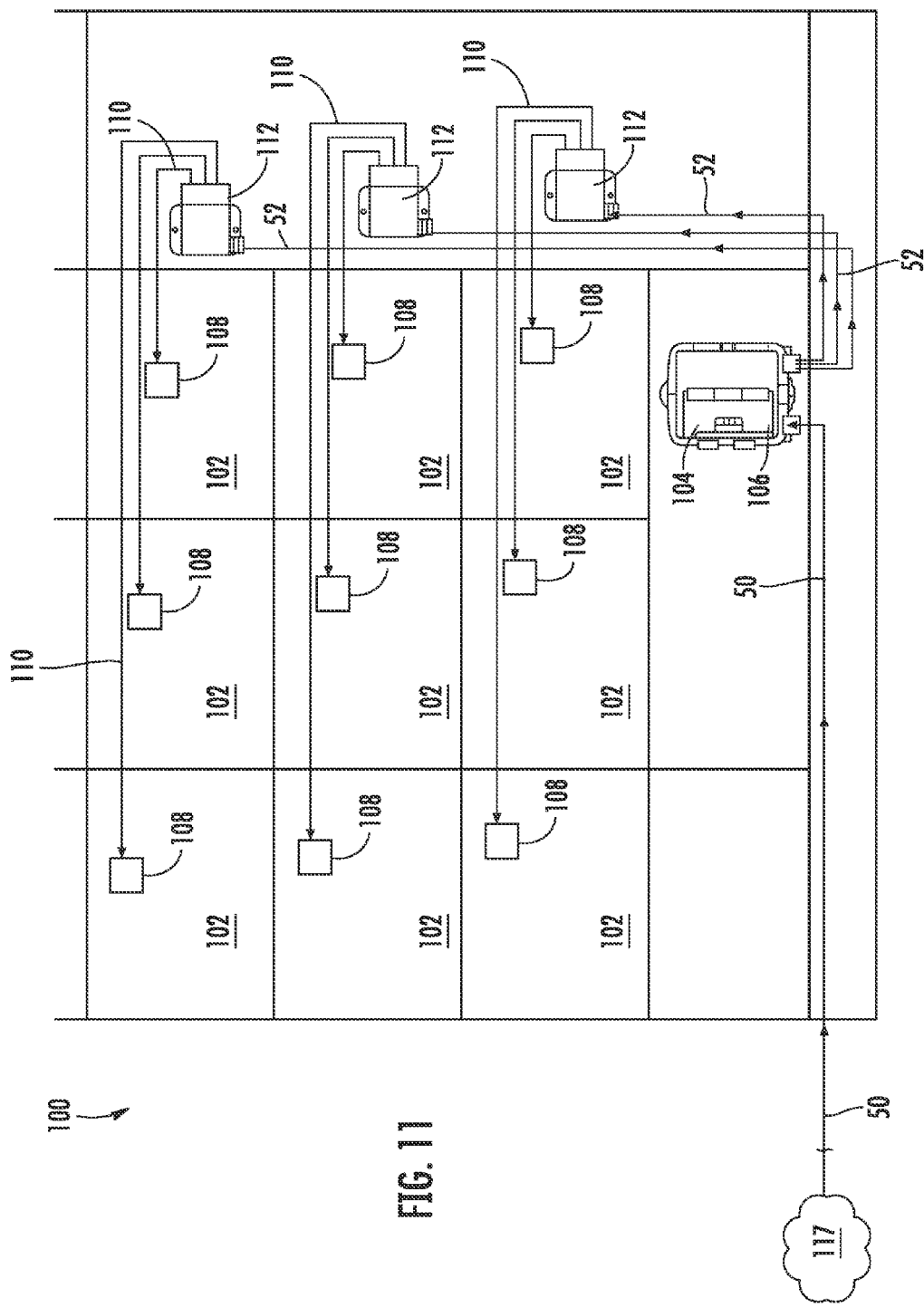

FIBER OPTIC TERMINALS CONFIGURED TO DISPOSE A FIBER OPTIC CONNECTION PANEL(S) WITHIN AN OPTICAL FIBER PERIMETER AND RELATED METHODS

PRIORITY APPLICATION

This application claims the benefit of U.S. Provisional Application Ser. No. 61/247,465 filed on Sep. 30, 2009, the entire contents of which are hereby incorporated by reference.

BACKGROUND

1. Technical Field

The field of the disclosure relates to fiber optic terminals. The fiber optic terminals can include, but are not limited to, local convergence points (LCPs) and fiber distribution terminals (FDTs).

2. Technical Background

To provide improved performance to subscribers, communication and data networks are increasingly employing optical fiber. The benefits of optical fiber are well known and include higher signal-to-noise ratios and increased bandwidth. To further improve performance, fiber optic networks are increasingly providing optical fiber connectivity all the way to end subscribers. These initiatives include various fiber-to-the-premises (FTTP), fiber-to-the-home (FTTH), and other fiber initiatives (generally described as FTTx). In this regard, FIG. 1 illustrates an exemplary fiber optic network 10. The fiber optic network 10 provides optical signals from switching points 12 over a distribution network 13 comprised of fiber optic feeder cables 14. The optical signals may be carried over the fiber optic feeder cables 14 to local convergence points (LCPs) 16. The LCPs 16 act as consolidation points for splicing and making cross-connections and interconnections, as well as providing locations for couplers and splitters. Fiber optic cables 18, such as distribution cables, exit the LCPs 16 to carry optical signals between the fiber optic network 10 and a subscriber's premises 20. Typical subscriber premises 20 include single-dwelling units (SDU), multi-dwelling units (MDU), businesses, and/or other facilities or buildings.

Because LCPs 16 are typically configured to service multiple premises 20, the fiber optic cables 18 leaving the LCPs 16 are typically run to one or more intermediate fiber distribution terminals (FDTs) 22. FDTs 22 facilitate FTTx applications by providing network access points to the fiber optic network 10 to groupings of subscribers' premises 20. Optical interconnections to the subscribers' premises 20 are typically provided via indoor/outdoor drop cables 24 that are optically interconnected with the fiber optic cables 18 within the FDTs 22. The FDTs 22 also provide a consolidated location for technicians or other installation personnel to make and protect splices between the drop cables 24 and the fiber optic cables 18 as opposed to making splices in sporadic locations.

In fiber optical terminals, including LCPs and FDTs, the size of the fiber optic terminal can be a factor. Fiber optic terminals must be sized to handle the desired number of subscribers, also known as subscriber capacity. For example, internal space is needed inside the fiber optic terminals to accommodate fiber optic cables and their optical fibers extended into the fiber optic terminal to achieve the desired subscriber capacity. Internal space is also needed inside the fiber optic terminal to accommodate the necessary optical interconnection components to establish optical connections for the desired subscriber capacity. It may also be desired to provide slack storage for optical fibers inside the fiber optic terminal to more easily allow optical fiber splices and/or other connections to be made within the fiber optic terminal. However, providing slack storage in the fiber optic terminal also requires providing internal space, which can interfere with internal space needed for optical interconnection components. One solution is to increase the size of the fiber optic terminal to increase the internal space inside the fiber optic terminal. However, it may not be possible or desired to increase the size of the fiber optic terminal. The size of a fiber optic terminal may be limited. This may be particularly true for MDU applications as an example, where available real estate for locating fiber optic terminals may be limited.

SUMMARY OF THE DETAILED DESCRIPTION

Embodiments disclosed in the detailed description include fiber optic terminals for establishing optical connections. In one embodiment, a fiber optic terminal is provided that includes a base defining an interior chamber. The interior chamber is configured to receive at least one network-side optical fiber and a plurality of subscriber-side optical fibers. The fiber optic terminal also includes a terminal cover that is configured to close onto the base to close off access to the interior chamber. A plurality of fiber routing guides are disposed in the base of the fiber optic terminal and define an optical fiber perimeter in the interior chamber of the base to allow network-side and/or subscriber-side optical fibers to be routed around the optical fiber perimeter. At least one fiber optic connection panel is disposed on an inside surface of the terminal cover for establishing optical connections between the network-side and subscriber-side optical fibers. The fiber optic connection panel is disposed on the internal surface of the terminal cover such that when the terminal cover is closed onto the base, the fiber optic connection panel is configured to be disposed within the optical fiber perimeter in the base. In this manner, the routing of optical fibers around the optical fiber perimeter of the base provides space for disposing the fiber optic connection panel in the fiber optic terminal when the terminal cover is closed onto the base. This arrangement may allow a larger number of optical fibers and optical connections made thereto to be provided in a fiber optic terminal of a given space.

Other optical components, including but not limited to optical splitters, may also be disposed on the inside surface of the terminal cover such that these optical components are disposed within the optical fiber perimeter when the terminal cover is closed onto the base. The fiber routing guides may also allow slack storage of optical fibers in the fiber optic terminal. Providing slack storage of optical fibers in the fiber optic terminal may more easily allow technicians to establish optical connections with optical fiber disposed in the fiber optic terminal.

In another embodiment, a method for optically connecting a subscriber-side optical fiber to a fiber optic network is provided. The method includes providing a fiber optic terminal. In one embodiment, the fiber optic terminal provided is as described in the preceding paragraph wherein a plurality of fiber routing guides disposed in the base of the fiber optic terminal form an optical fiber perimeter where network-side and/or subscriber-side optical fiber can be routed around the optical fiber perimeter. At least one network-side optical fiber and a plurality of subscriber-side optical fibers are provide in the fiber optic terminal. The at least one network-side optical fiber is connected to at least one input fiber optic adapter disposed in a fiber optic connection panel disposed on an internal surface of a terminal cover for the fiber optic terminal. One or more of the plurality of subscriber-side optical fibers is connected to one or more of a plurality of output fiber optic adapters disposed in fiber optic connection panel. The fiber optic connection panel is disposed within the optical fiber perimeter when the terminal cover is closed onto the base of the fiber optic terminal.

The fiber optic terminals can be employed to facilitate providing direct or intermediate optical connections between a fiber optic network and end subscribers. The fiber optic terminals disclosed herein may be used for any type of fiber optic terminal, including but not limited to local convergence points (LCPs) and fiber distribution terminals (FDTs). The fiber optic terminals disclosed herein may be used for any fiber optic distribution application, including but not limited to directly or intermediately routing fiber optic cables and optical fibers from a fiber optic network(s) to end subscribers. This includes, but is not limited to, various fiber-to-the-premises (FTTP), fiber-to-the-home (FTTH), and other fiber initiatives (generally described as FTTx). Subscriber premises include, but are not limited to, single-dwelling units (SDU), multi-dwelling units (MDU), businesses, and/or other facilities or buildings.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 11 illustrates an exemplary multi-dwelling unit (MDU) that includes fiber optic terminals, including local convergence points (LCPs) and exemplary fiber distribution terminals (FDTs), and that can include the fiber optic terminal of FIG. 2, for providing optical fiber connectivity to end subscribers.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include fiber optic terminals for establishing optical connections. In one embodiment, a fiber optic terminal is provided that includes a base defining an interior chamber. The interior chamber is configured to receive at least one network-side optical fiber and a plurality of subscriber-side optical fibers. The fiber optic terminal also includes a terminal cover that is configured to close onto the base to close off access to the interior chamber. A plurality of fiber routing guides are disposed in the base of the fiber optic terminal and define an optical fiber perimeter in the interior chamber of the base to allow network-side and/or subscriber-side optical fibers to be routed around the optical fiber perimeter. At least one fiber optic connection panel is disposed on an inside surface of the terminal cover for establishing optical connections between the network-side and subscriber-side optical fibers. The fiber optic connection panel is disposed on the internal surface of the terminal cover such that when the terminal cover is closed onto the base, the fiber optic connection panel is configured to be disposed within the optical fiber perimeter in the base. In this manner, the routing of optical fibers around the optical fiber perimeter of the base provides space for disposing the fiber optic connection panel in the fiber optic terminal when the terminal cover is closed onto the base. This arrangement may allow a larger number of optical fibers and optical connections made thereto to be provided in a fiber optic terminal of a given space.

The fiber optic terminals disclosed herein may be used for any type of fiber optic terminal, including but not limited to local convergence points (LCPs) and fiber distribution terminals (FDTs). For example, if the fiber optic terminal is configured as a local convergence point (LCP), the network-side or upstream fiber optic cable may be a feeder cable from a central office or switching point. The subscriber-side or downstream fiber optic cable may be a distribution cable. If the fiber optic terminal is configured as a fiber distribution terminal (FDT), the network-side or upstream fiber optic cable may be a distribution cable, and the subscriber-side or downstream fiber optic cable may be a drop cable. The drop cable may then be routed to an end subscriber(s) for FTTx applications.

Figure 1:
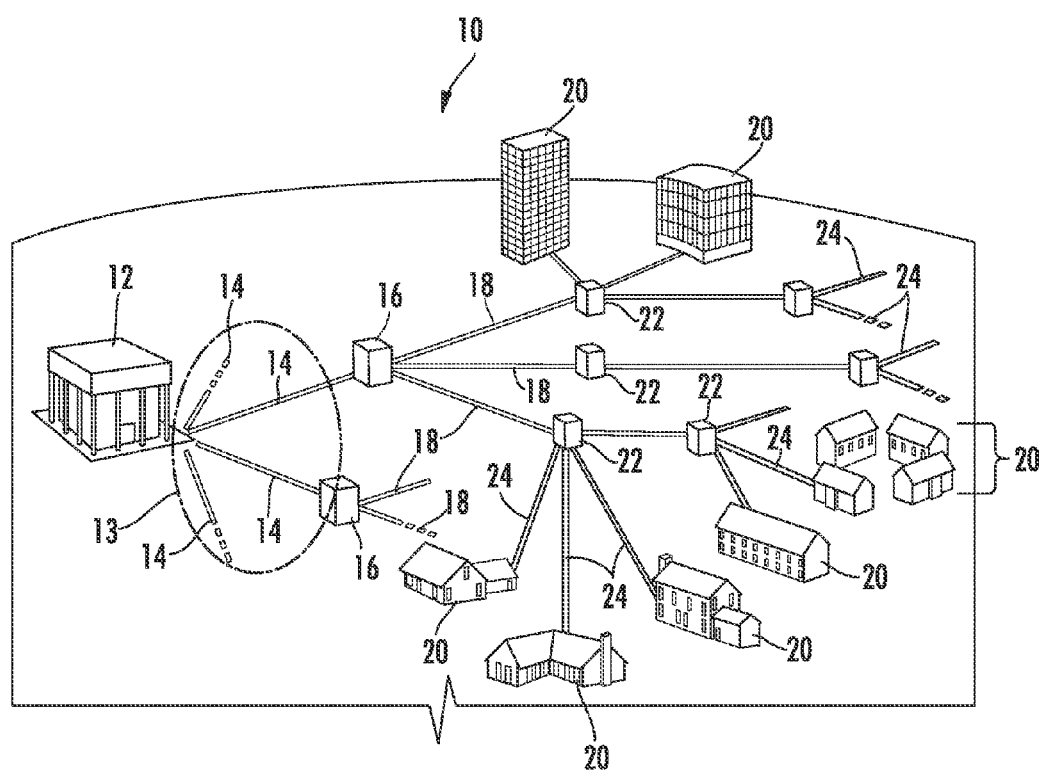
FIG. 1 illustrates an exemplary fiber optic network that includes fiber optic terminals for carrying optical signals over the fiber optic network.
Figure 2:
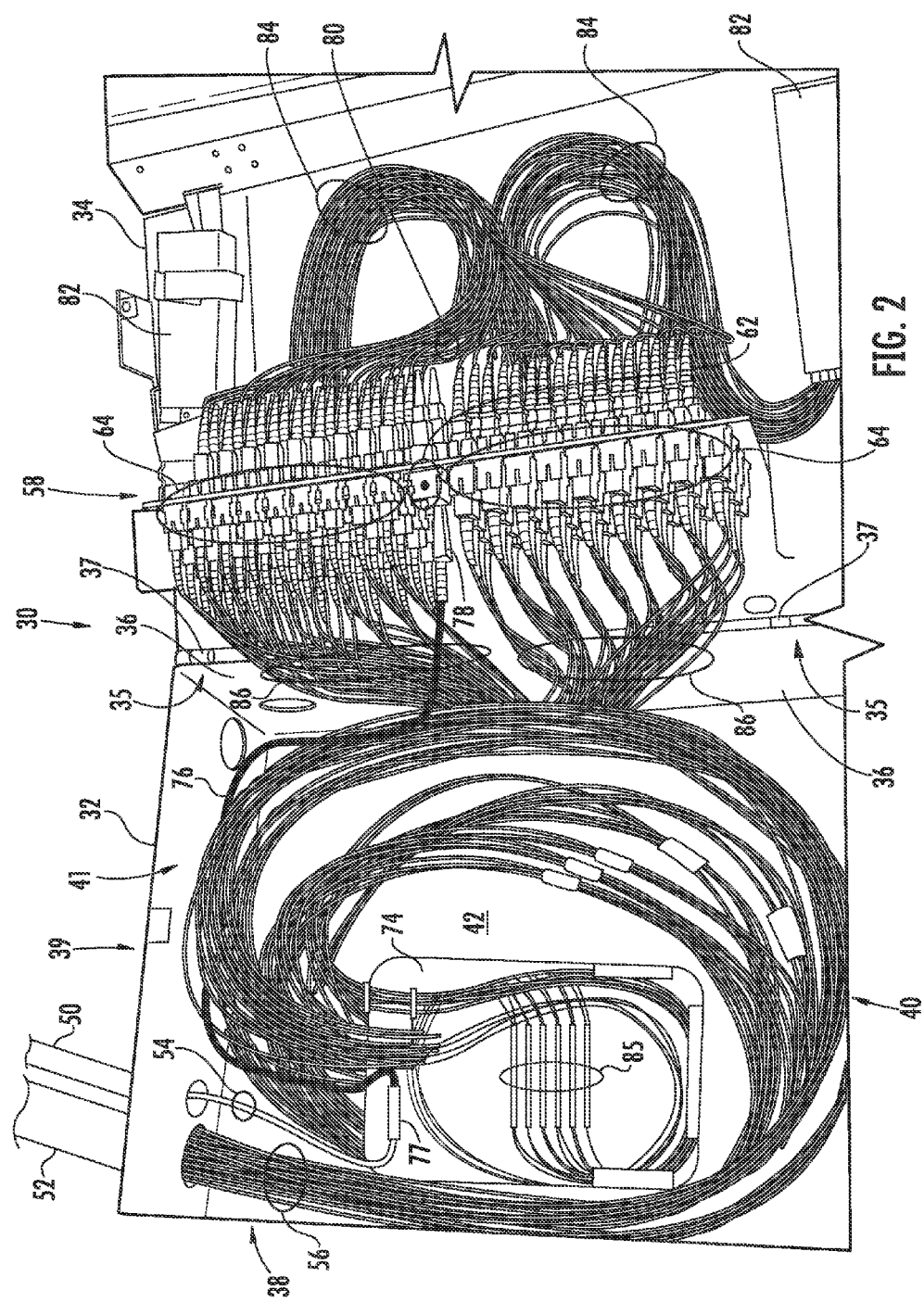
FIG. 2 is an exemplary fiber optic terminal with exemplary established optical fiber connections made in fiber optic adapters provided on a fiber optic connection panel disposed on the inside surface of a terminal cover of the fiber optic terminal.

In this regard, FIG. 2 illustrates an exemplary embodiment of a fiber optic terminal 30 according to one embodiment of the disclosure. The fiber optic terminal 30 provides a convenient access point in a telecommunications or data network for a field technician to install and reconfigure optical fiber connections between network-side and subscriber-side fiber optic cables. The fiber optic terminal 30 is configured to allow one or more optical fibers provided in one or more network-side or upstream fiber optic cables to be easily and readily interconnected with one or more optical fibers in one or more subscriber-side or downstream fiber optic cables. By the term "subscriber-side," it is meant that optical fiber, fiber optic cable, or optical connection, as the case may be, is provided anywhere between the end subscriber and the fiber optic terminal 30. A subscriber-side fiber optic cable, optical fiber, or optical connection may be provided directly to an end subscriber or may be provided to one or more intermediate optical terminals or components before reaching an end subscriber. By the term "network-side," it is meant that the optical fiber, fiber optic cable, or optical connection, as the case may be, is provided between a fiber optic network, central switching point, central office, or the like and the fiber optic terminal 30.

In this embodiment, as will be described in more detail below, an optical fiber perimeter is provided in the fiber optic terminal 30 to allow a fiber optic connection panel to be disposed within the optical fiber perimeter when the fiber optic terminal 30 is closed. In this manner, internal space is provided for the fiber optic connection panel. Other optical components may also be disposed within the optical fiber perimeter. This arrangement may allow a larger number of optical fibers and optical connections made thereto to be provided in the fiber optic terminal 30 for its given size.

Figure 3:
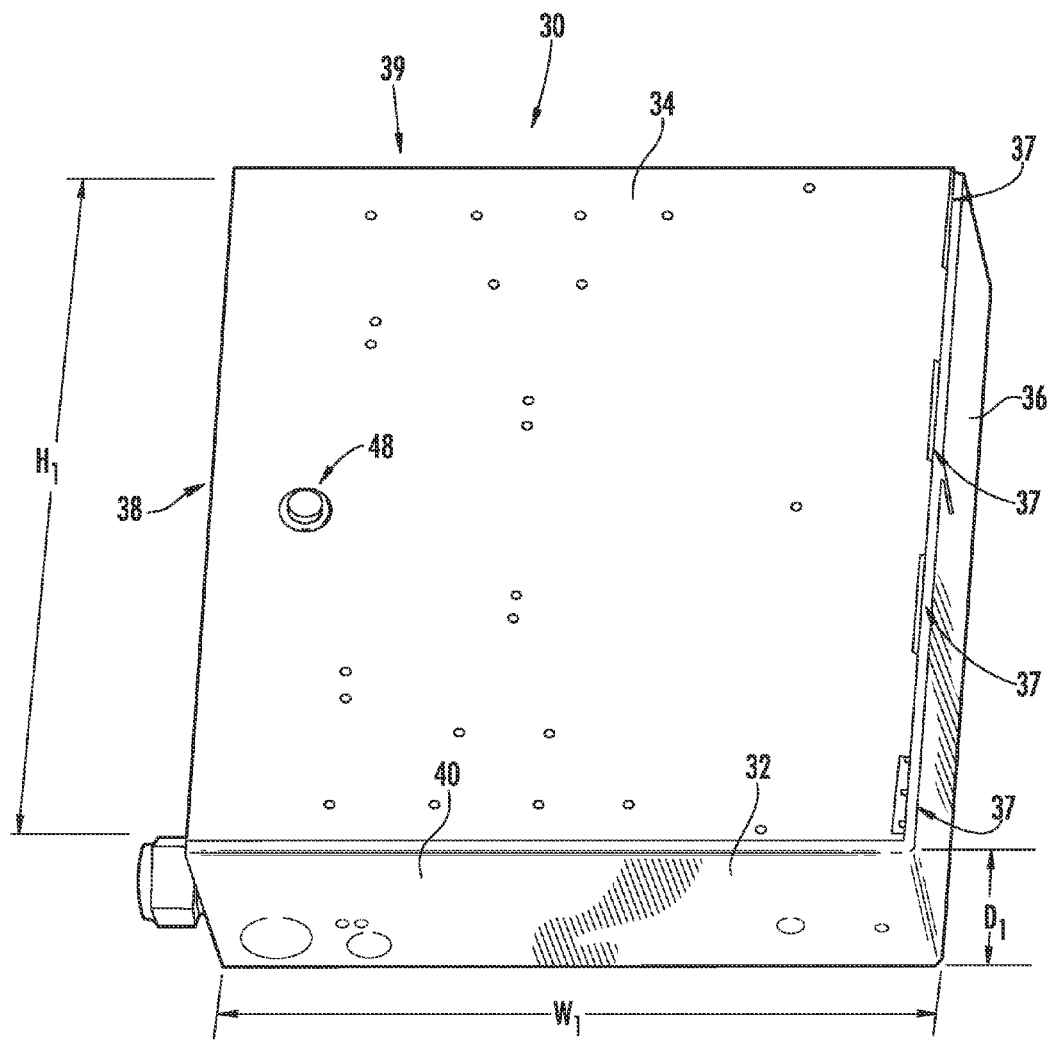
FIG. 3 illustrates the fiber optic terminal of FIG. 2 with the terminal cover closed.

In this regard, the fiber optic terminal 30 illustrated in FIG. 2 comprises a base 32 and a terminal cover 34 hingedly affixed to the base 32 and opened thereon. The base 32 and terminal cover 34 may be made of a rigid material, such as aluminum, plastic, or thermoplastic, as examples. The base 32 and the terminal cover 34 serve to close off and protect the internal components of the fiber optic terminal 30 when the terminal cover 34 is closed on the base 32, as illustrated in FIG. 3. With reference to FIG. 2, the terminal cover 34 is generally rectangular in this embodiment, although other shapes are possible. The terminal cover 34 in this embodiment is hingedly affixed to the base 32 of similar form along an upper edge 35 of a right side wall 36 at one or more hinge locations 37 (see also, FIG. 3). In this manner, the terminal cover 34 can be rotated about the hinge locations 37 when the terminal cover 34 is opened from the base 32. To limit the amount of opening of the terminal cover 34 from the base 32, a limiting member 33 may be attached between the terminal cover 34 and the base 32 (see FIG. 5). The limiting member 33 may be provided in the form of a bracket having a defined geometry and length to limit the opening of the terminal cover 34.

The base 32 is also comprised of a left side wall 38 disposed opposite and generally parallel to the right side wall 36, both of which are attached or interconnected on ends to a top side wall 39 and bottom side wall 40 (see also, FIG. 3). The right side wall 36, left side wall 38, top side wall 39 and bottom side wall 40 are either attached as separate pieces, or folded up as part of a single sheet of material to be disposed in planes orthogonal or substantially orthogonal about a back wall 41. In this manner, an interior chamber 42 is formed within the base 32 (see also, FIG. 4). The interior chamber 42 provides room for routing and/or storage of network-side and subscriber-side fiber optic cables and the optical fibers therein and making optical interconnections between the two, including through any intermediate optical components that may be provided in the fiber optic terminal 30, such as splice trays, coupler trays, and adapters as examples, as will be described in more detail below.

With continuing reference to FIGS. 2 and 3, a technician can open the terminal cover 34 to access the interior chamber 42 of the fiber optic terminal 30, such as to install or reconfigure optical interconnections within the fiber optic terminal 30. After completion, the terminal cover 34 can be closed against the base 32 to close the fiber optic terminal 30 thus closing off access to the interior chamber 42. To secure the cover terminal 34 to the base 32 in this embodiment, the base 32 contains a lip 44 (illustrated in FIG. 6) extending from the left side wall 38 towards the interior chamber 42. The terminal cover 34 also contains a lip 46 (illustrated in FIG. 5) that can rotate under control of a key lock 48 (illustrated in FIGS. 3 and 5). The lip 46 disposed in the terminal cover 34 is configured to interlock with the lip 44 disposed in the base 32 when the terminal cover 34 is closed onto the base 32 to secure the terminal cover 34 to the base 32. When the terminal cover 34 is closed in this example, as illustrated in FIG. 3, the fiber optic terminal 30 has the approximate dimensions of four hundred thirty (430) millimeters (mm) height ($H_1$), four hundred (400) mm width ($W_1$), and one hundred thirty five (135) mm depth ($D_1$). However, the fiber optic terminal 30 is not limited to these dimensions and any dimensions desired are possible.

As illustrated in FIG. 2 and discussed in more detail herein, the fiber optic terminal 30 and its internal components facilitate making optical connections between optical fiber(s) provided by one or more network-side fiber optic cables 50 and one or more subscriber-side fiber optic cables 52 to establish a connection between an end subscriber and a fiber optic network. Both the network-side fiber optic cable 50 and the subscriber-side fiber optic cable 52 may be distribution cables. The fiber optic terminal 30 may be particularly suited for high volume/density optical connections. In this regard, as illustrated by example in FIG. 2, the network-side fiber optic cable 50 provides one or more network-side optical fibers 54 configured to be optically connected to a fiber optic network for carrying optical signals to and from the fiber optic network. The subscriber-side fiber optic cable 52 also contains one or more subscriber-side optical fibers 56 which are configured to be run to or towards end subscribers directly or through one or more intermediate terminals and/or other optical components. Thus, when a network-side optical fiber(s) 54 provided in the network-side fiber optic cable 50 is optically connected to a subscriber-side optical fiber(s) 56 provided in the subscriber-side fiber optic cable 52 within the fiber optic terminal 30, an optical connection can be established between an end subscriber and a fiber optic network.

Figure 4:
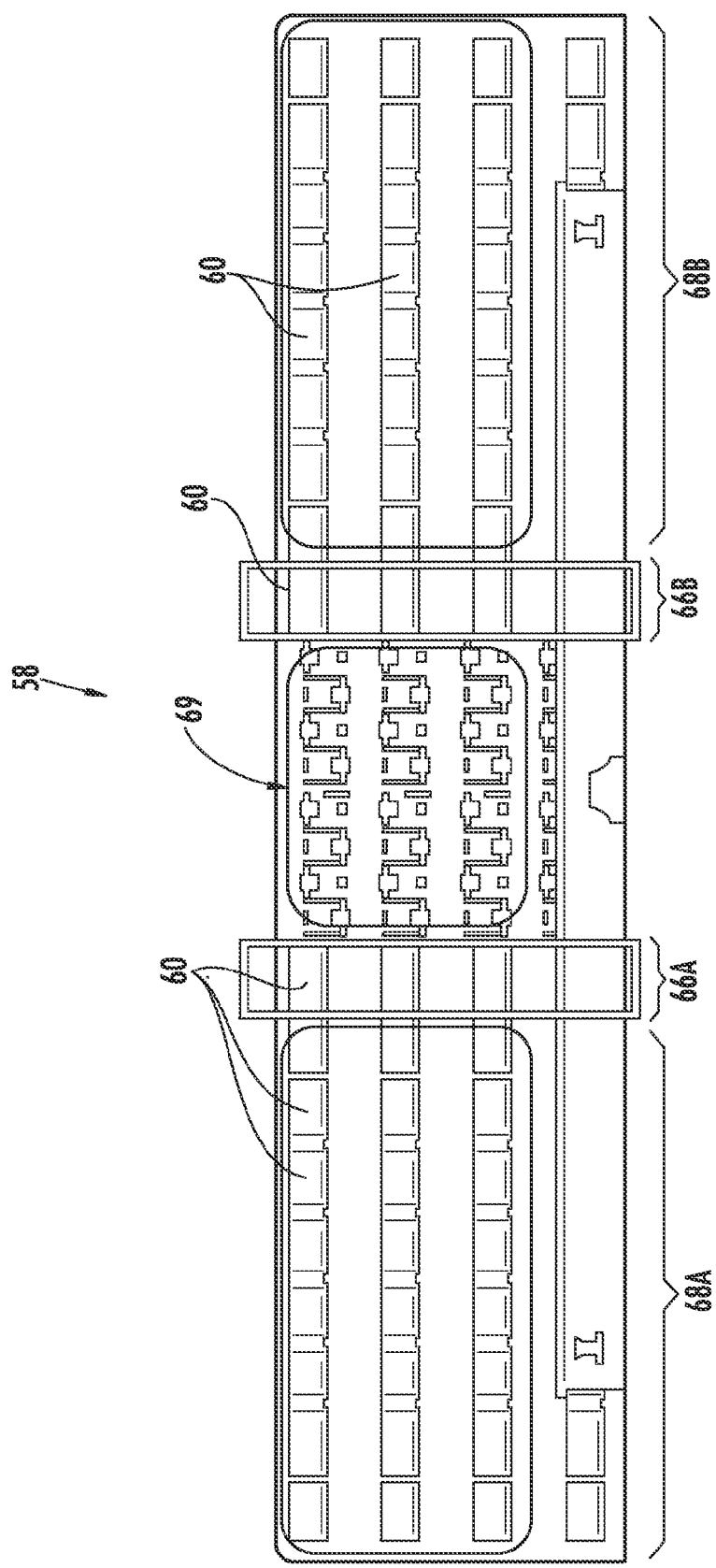
FIG. 4 illustrates a side view of the fiber optic connection panel disposed in the inside of the terminal cover of the fiber optic terminal of FIG. 2.

As will be described herein, one or more network-side optical fibers 54 from the network-side fiber optic cable 50 and one or more subscriber-side optical fibers 56 from the subscriber-side fiber optic cable 52 are optically connected to each other at a fiber optic connection panel 58. The fiber optic connection panel 58 can be a panel or module that contains or supports a plurality of optical fiber connections. In this embodiment, as illustrated in FIG. 4, the fiber optic connection panel 58 contains one or more openings 60 to support one or more input fiber optic adapters 62 and output fiber optic adapters 64 (FIG. 2) for supporting optical fiber connections. The input and output fiber optic adapters 62, 64 support making optical connections between one or more network-side optical fibers 54 from the network-side fiber optic cable 50 and one or more subscriber-side optical fibers 56 from the subscriber-side fiber optic cable 52. In this regard, as will be described in more detail below, one or more network-side optical fibers 54 from the network-side fiber optic cable 50 will be spliced into network-side splices and optically connected to one or more input fiber optic adapters 62. One or more subscriber-side optical fibers 56 from the subscriber-side fiber optic cable 52 will be spliced into subscriber-side splices and optically connected to one or more output fiber optic adapters 64. The input and output fiber optic adapters 62, 64 are LC adapters in the embodiment of FIG. 2, but may be of any connection type, including but not limited to SC, LC, MTP, FC, ST, MU, or MTRJ.

In this embodiment as illustrated in FIG. 4, the input and output fiber optic adapters 62, 64 can be arranged such that the input fiber optic adapters 62 (FIG. 2) can be disposed in central areas 66A, 66B and the output fiber optic adapters 64 (FIG. 2) can be disposed in outer areas 68A, 68B of the fiber optic connection panel 58. The fiber optic connection panel 58 can be configured to provide both input and output fiber optic adapters 62, 64 on the same panel to facilitate ease in initially installing or reconfiguring optical connections. Further, any fiber optic adapter disposed in the fiber optic connection panel 58 and any number of same can be configured as either input or output fiber optic adapters 62, 64 to provide flexibility when installing or reconfiguring optical connections. The fiber optic connection panel 58 can also be configured to include a fiber parking area 69 to provide room for optical fibers to be stored. This scenario would exist when an optical fiber is run to an end subscriber, but the subscriber's optical fiber has not yet been connected. In such case, it may be desirable to "park" any unconnected input and/or output fibers 80, 84 (FIG. 2) to prevent them from being damaged. Further, more than one fiber optic connection panel 58 may be provided, although the fiber optic terminal 30 illustrated in FIG. 2 contains one fiber optic connection panel 58.

Figure 5:
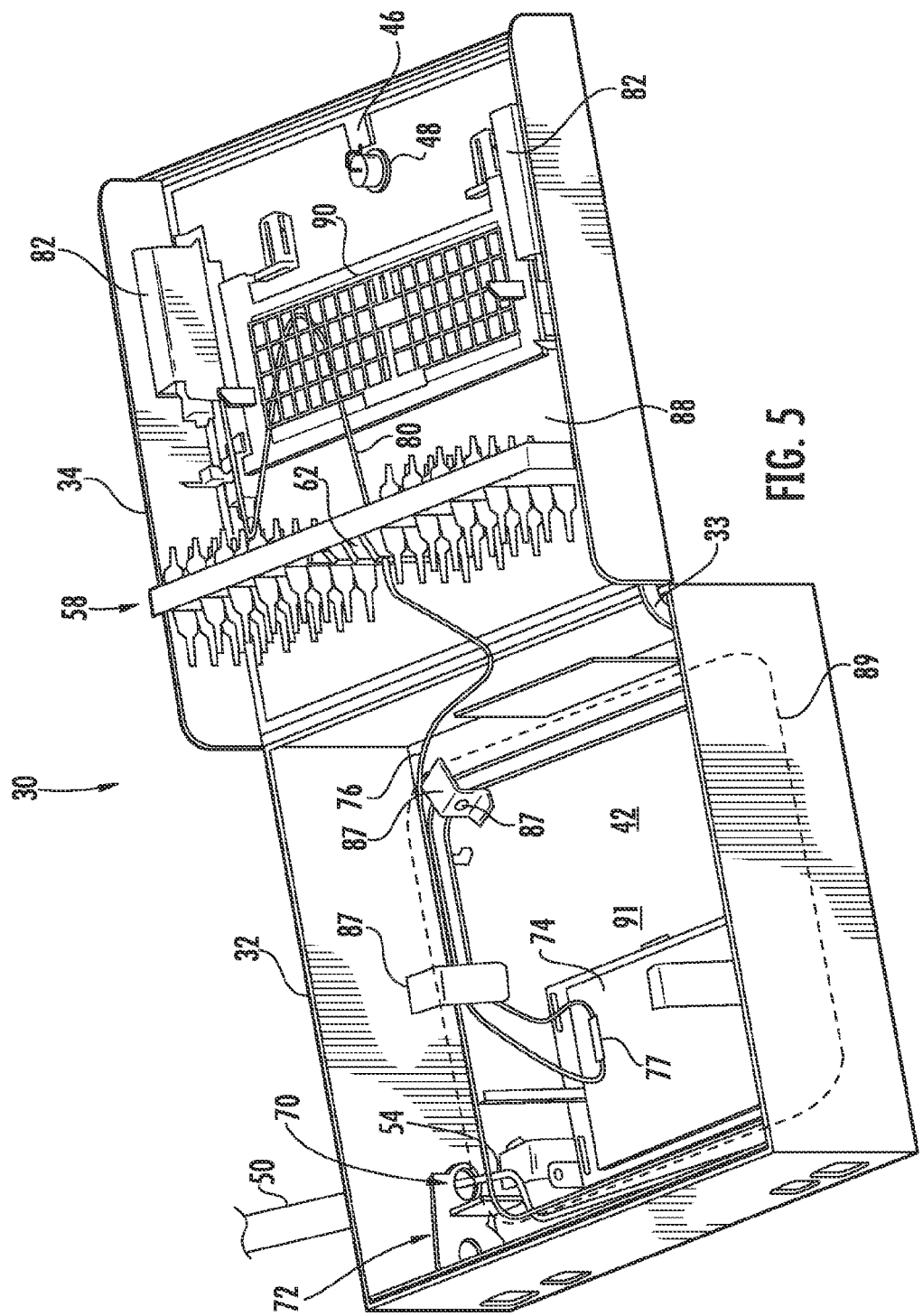
FIG. 5 illustrates the fiber optic terminal of FIG. 2 illustrating optical connections between connectorized ends of exemplary input pigtails to a fiber optic adapter disposed in the fiber optic connection panel, and connection of an exemplary connectorized input fiber from an exemplary optical splitter(s) to the fiber optic adapter.
Figure 6:
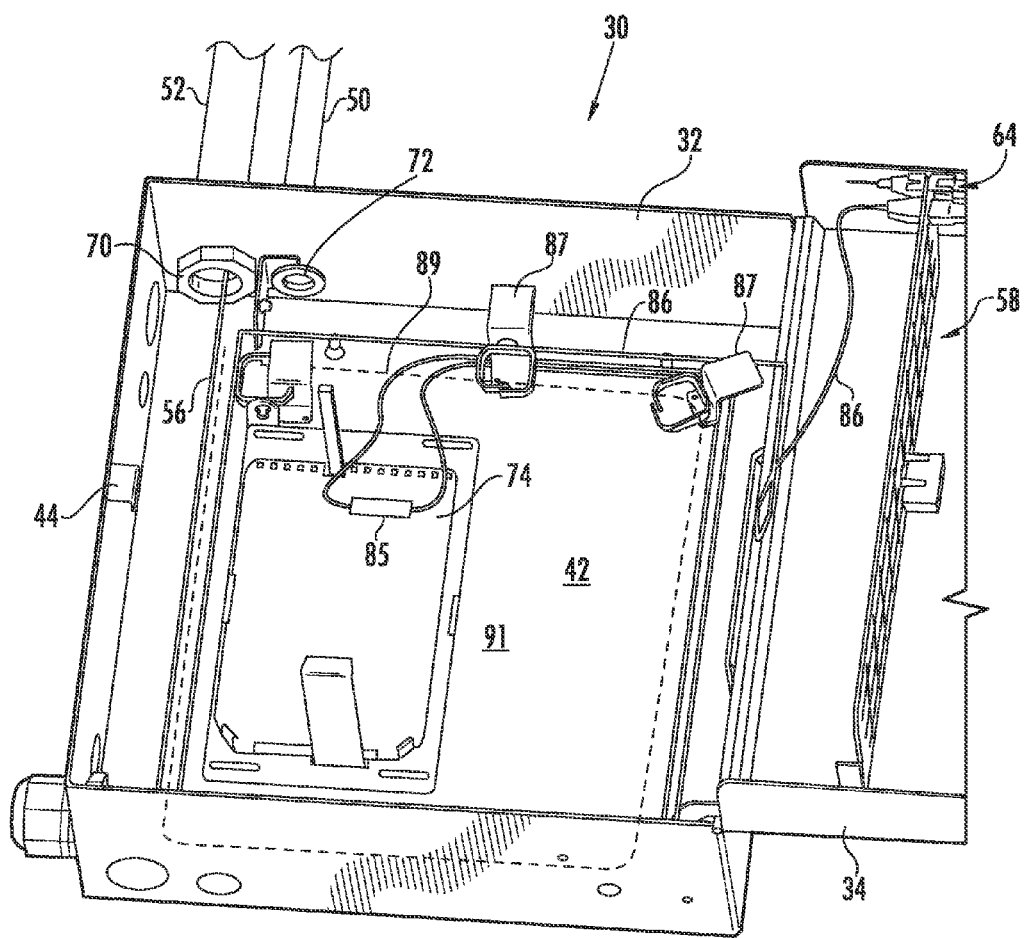
FIG. 6 illustrates the fiber optic terminal of FIG. 2 illustrating optical connections between connectorized ends of exemplary output pigtails to a fiber optic adapter disposed in the fiber optic connection panel, and connection of an exemplary connectorized output fiber from an exemplary optical splitter(s) to the fiber optic adapter.

Further details regarding the fiber optic terminal 30 facilitating optical connection between network-side optical fiber(s) 54 and subscriber-side optical fiber(s) 56 will now be discussed. As illustrated in FIGS. 5 and 6, the fiber optic terminal 30 receives the network-side fiber optic cable 50 and a subscriber-side fiber optic cable 52 via respective cable port assemblies 70, 72 disposed in the base 32. Transport tubes (not shown) may also be disposed in the cable port assemblies 70, 72 and configured to receive the network-side fiber optic cable 50 and the subscriber-side fiber optic cable 52 to provide strain relief. Although only one network-side fiber optic cable 50 and one subscriber-side fiber optic cable 52 are illustrated, note that the fiber optic terminal 30 could be provided with multiple ports to accept and provide optical connections between multiple network-side fiber optic cables 50 and/or subscriber-side fiber optic cables 52.

With reference back to FIG. 2, to make an optical connection between one or more network-side optical fibers 54 from the network-side fiber optic cable 50, the network-side optical fiber 54 is spliced in a splice tray 74 to an input pigtail 76 in a network splice 77. The input pigtail 76 is connected on a connectorized end 78 to an input fiber optic adapter 62. The other end of the input fiber optic adapter 62 is connected to an input fiber 80 which is an input into an optical splitter 82. The optical splitter 82 is configured to split optical signals carried by the input fiber 80, via connection to the input fiber optic adapter 62, into a plurality of connectorized output fibers 84. One or more of the output fibers 84 can then be connected into one or more of the output fiber optic adapters 64 to optically connect to output pigtails 86. The output pigtails 86 are spliced, via the splice tray 74, into the subscriber-side optical fibers 56 in the subscriber-side fiber optic cable 52. In this manner, an optical connection is made between the network-side optical fiber(s) 54 and subscriber-side network optical fiber(s) 56.

In the fiber optic terminal 30, two optical splitters 82 are provided. Note however that any splitting configuration is possible to be provided by the fiber optic terminal 30, including providing one or more than two optical splitters 82. Other splitter configuration examples include, without limitation, 1×32, 1×16, 1×8, and 1×4. The splitter configuration depends on factors such as the number of network-side fiber optic cables 50, the number of subscriber-side fiber optic cables 52, the available space in the fiber optic terminal 30, and the connector type for the input and output fiber optic adapters 62, 64. For example, for SC connector types, the fiber optic terminal 30 may accommodate one (1) 1×32 optical splitter, or eight (8) 1×4 optical splitters for a total of thirty-two (32) output fibers 84, or three (3) 1×16 optical splitters, or six (6) 1×8 optical splitters for a total of forty-eight (48) output fibers 84. LC connector types may accommodate three (3) 1×32 optical splitters, six (6) 1×16 optical splitters, or twelve (12) 1×8 optical splitters for a total of ninety-six (96) output fibers 84.

In order to assist or prevent a technician from incorrectly installing an input fiber 80 into an output fiber optic adapter 64, and/or an output fiber 84 into an input fiber optic adapter 62, the input fibers 80 and/or output fibers 84 from the optical splitter 82 in the fiber optic terminal 30 may be marked. Such may be marked by cable jackets or sleeves of different colors or other visual markings, such as lines, symbols, etc. For example, as illustrated in FIG. 2, the input fiber 80 is marked by being illustrated as solid, which could be indicative of any type of marking, coloring, or other visual indicator. Also, as illustrated in FIG. 2, the input fiber optic adapter 62 can be marked in lieu of or in addition to marking of the input fiber 80. The marking on the input fiber optic adapter 62 is illustrated as a dot, but can be any other type of marking. Other or similar marking may also be provided on the output fibers 84 and/or the output fiber optic adapters 64 in the same or similar regard to allow a technician to distinguish input fibers 80 from output fibers 84 and/or input fiber optic adapters 62 from output fiber optic adapters 64. Further, the input and output fiber optic adapters 62, 64 may be shuttered or keyed with a corresponding matching key provided on the input fibers 80 and/or the output fibers 84 (or fiber optic connectors on connectorized ends of the input fibers 80 and/or the output fibers 84) to prevent an input fiber 80 from being connected to an output fiber optic adapter 64 and/or an output fiber 84 from being connected into an input fiber optic adapter 62.

The components and aspects of the fiber optic terminal 30 to route optical fibers from the network-side fiber optic cable 50 and the subscriber-based fiber optic cable 52 to the input and output fiber optic adapters 62, 64 disposed in the fiber optic connection panel 58 will now be described with regard to FIGS. 5 and 6. FIG. 5 illustrates more detail regarding exemplary routing and physical and optical connections provided for network-side optical fibers 54 from the network-side fiber optic cable 50 to an input fiber optic adapter 62 to establish an optical connection with a subscriber-side optical fiber(s) 56. FIG. 6 illustrates more detail regarding exemplary routing and optical connections provided for subscriber-side optical fibers 56 from the subscriber-side fiber optic cable 52 to an output fiber optic adapter 64 to establish an optical connection with a subscriber-side optical fiber(s) 56. As previously discussed and illustrated in FIG. 2, providing network-side and subscriber-side optical fiber(s) 54, 56 from the network-side fiber optic cable 50 and the subscriber-based fiber optic cable 52, respectively, to the input and output fiber optic adapters 62, 64 supported by the fiber optic connection panel 58 facilitates making optical connections between a fiber optic network and subscribers.

With reference to FIG. 5, one or more network-side optical fibers 54 from the network-side fiber optic cable 50 come into to interior chamber 42 of the base 32, as previously discussed. A technician will typically strip the cable jacket around the network-side fiber optic cable 50 run inside the base 32 to expose the one or more network-side optical fibers 54. The network-side optical fiber(s) 54 can be routed in the interior chamber 42 around one or more fiber routing guides 87. The fiber routing guides 87 can route optical fiber and/or fiber optic cables. The fiber routing guides 87 are configured to route network-side optical fiber(s) 54 around an optical fiber perimeter 89 inside the interior chamber 42. In this manner, the routed network-side optical fiber(s) 54 can be disposed around the optical fiber perimeter 89 in the base 32 to keep an interior area 91 inside the optical fiber perimeter 89 free or substantially free of routed optical fibers. As will be discussed in more detail below, providing the optical fiber perimeter 89 for optical fiber routing may allow sufficient space for optical components to be disposed or stored inside the optical fiber perimeter 89 in the interior area 91. The fiber routing guides 87 also allow for slack storage of the network-side optical fiber(s) 54, if needed or desired.

Next, the network-side optical fiber(s) 54 can then be spliced to the input pigtail 76 via the splice tray 74 in the network splice 77. Inside the splice tray 74, one or more network-side splices 77 or splice holders are provided to splice the network-side optical fiber(s) 54 into one or more input pigtails 76 for each network-side optical fiber 54 in any known manner, including fusion or mechanical splicing. For purposes of clarity, only a representative one of the network-side optical fibers 54 existing in the splice tray 74 and terminating into an input pigtail 76 is described herein. However, it will be readily apparent and well understood by one of ordinary skill in the art that other network-side optical fibers, if provided, can be spliced into input pigtails and routed in the substantially the same manner.

Upon exiting the splice tray 74, the input pigtail 76 can be routed around one or more of the fiber routing guides 87 in the interior chamber 42 and then to an input fiber optic adapter 62 provided in the fiber optic connection panel 58. In this embodiment, the fiber optic connection panel 58 is disposed on an inside surface 88 of the terminal cover 34. In this manner, the input pigtail 76 is optically connected to an input fiber optic adapter 62 so as to be accessible for a technician to establish optical connections to the network-side optical fiber (s) 54. Thus, the fiber optic connection panel 58 provided in the fiber optic terminal 30 allows for input and output fiber optic adapters 62, 64 to be configured as either an input fiber optic adapter 62 or an output fiber optic adapter 64. The nature of whether a fiber optic adapter 62, 64 is configured as either an input fiber optic adapter or an output fiber optic adapter depends on whether an input pigtail 76 or an output pigtail 86 is optically connected to the fiber optic adapters.

Once the input pigtail 76 is routed and optically connected to an input fiber optic adapter 62, an optical connection can be established to the network-side optical fiber(s) 54. In this regard in this embodiment, the input fiber 80 from the optical splitter 82 is then connected to the corresponding input fiber optic adapter 62 receiving the input pigtail 76 to establish an optical connection between the network-side optical fiber 54 and the optical splitter 82. An optical fiber cover 90 is disposed adjacent to the fiber optic connection panel 58 in the terminal cover 34, as illustrated in FIG. 5, so that the input fiber 80 can be routed underneath the optical fiber cover 90 to retain the input fiber 80 adjacent to the inside surface 88 of the terminal cover 34. More details regarding the optical fiber cover 90 will be discussed below. Next, the routing of one or more subscriber-side optical fibers 56 provided by the subscriber-side fiber optic cable 52 to establish optical connections to one or more of the output fiber optic adapters 64 is discussed. Once established, one or more network-side optical fibers 54 and subscriber-side optical fibers 56 between the network-side fiber optic cable 50 and the subscriber-side fiber optic cable 52 can be optically connected to each other by coupling input and output fiber optic adapters 62, 64 together.

FIG. 6 illustrates the fiber optic terminal 30 of FIG. 2, but only showing a subscriber-side optical fiber 56 being routed and connected to the fiber optic connection panel 58 for discussion purposes. As illustrated in FIG. 6, one or more subscriber-side optical fibers 56 are extended inside the interior chamber 42 of the base 32, as previously discussed. A technician will typically strip the cable jacket around the subscriber-side fiber optic cable 52 run inside the base 32 and into the interior chamber 42 to expose the one or more of the subscriber-side optical fibers 56. The subscriber-side optical fiber(s) 56 can be routed around the fiber routing guides 87 to be disposed in the interior area 91 and connected to output pigtails 86 via the splice tray 74. The fiber routing guides 87 can also provide for slack storage of the subscriber-side optical fiber(s) 56, if needed or desired. The subscriber-side optical fiber(s) 56 can then be optically connected to the splice tray 74 in this embodiment. Inside the splice tray 74, one or more subscriber-side splices or splice holders 85 are provided to splice the subscriber-side optical fiber(s) 56 into one or more output pigtails 86 for each subscriber-side optical fiber 56 in any known manner, including fusion or mechanical splicing. For purposes of clarity, only a representative one of the subscriber-side optical fibers 56 existing in the splice tray 74 and terminating in the output pigtail 86 is described herein. However, it will be readily apparent and well understood by one of ordinary skill in the art that other subscriber-side optical fibers, if provided, can be spliced into output pigtails and routed in the substantially the same manner.

Figure 7:
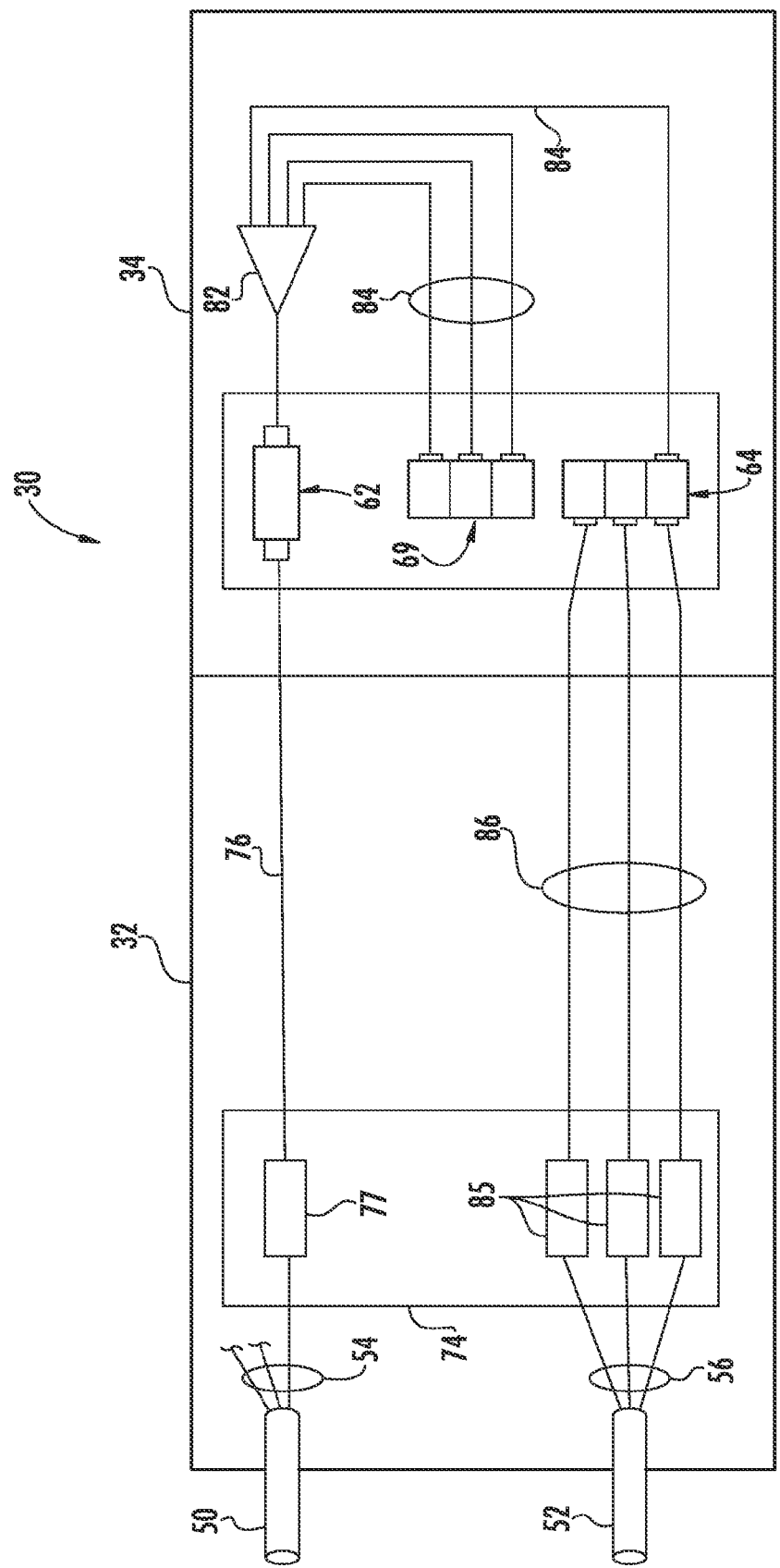
FIG. 7 is a block diagram of the fiber optic terminal of FIG. 2 and the optical fiber connections made therein.

Upon exiting the splice tray 74, the output pigtail 86 can be routed around one or more of the fiber routing guides 87, if desired, and connected to an output fiber optic adapter 64 in the fiber optic connection panel 58. In this manner, the output pigtail 86 is optically connected to an output fiber optic adapter 64 accessible in the terminal cover 34 for a technician to establish optical connections to the subscriber-side optical fiber(s) 56 when desired. In this regard and in summary, FIG. 7 illustrates a block diagram of the fiber optic terminal 10 of FIG. 2 and the optical connections made therein. At this point, one or more network-side optical fibers 54 from the network-side fiber optic cable 50 and one or more subscriber-side optical fibers 56 from the subscriber-side fiber optic cable 52 have been received, routed, spliced into input and output pigtail(s) 76, 86 and connected to input and output fiber optic adapter(s) 62, 64, respectively, disposed in the fiber optic connection panel 58.

As previously discussed, because the input and output fibers 80, 84 from the optical splitter 82 are connected to the input and output fiber optic adapters 62, 64, respectively, as illustrated in FIGS. 5 and 6, respectively, the network-side optical fiber 54 is optically connected to the subscriber-side optical fiber 56. When the desired optical connections in this regard are finalized, a technician can close the terminal cover 34 to close off the interior chamber 42, as illustrated in FIG. 8.

Figure 8:
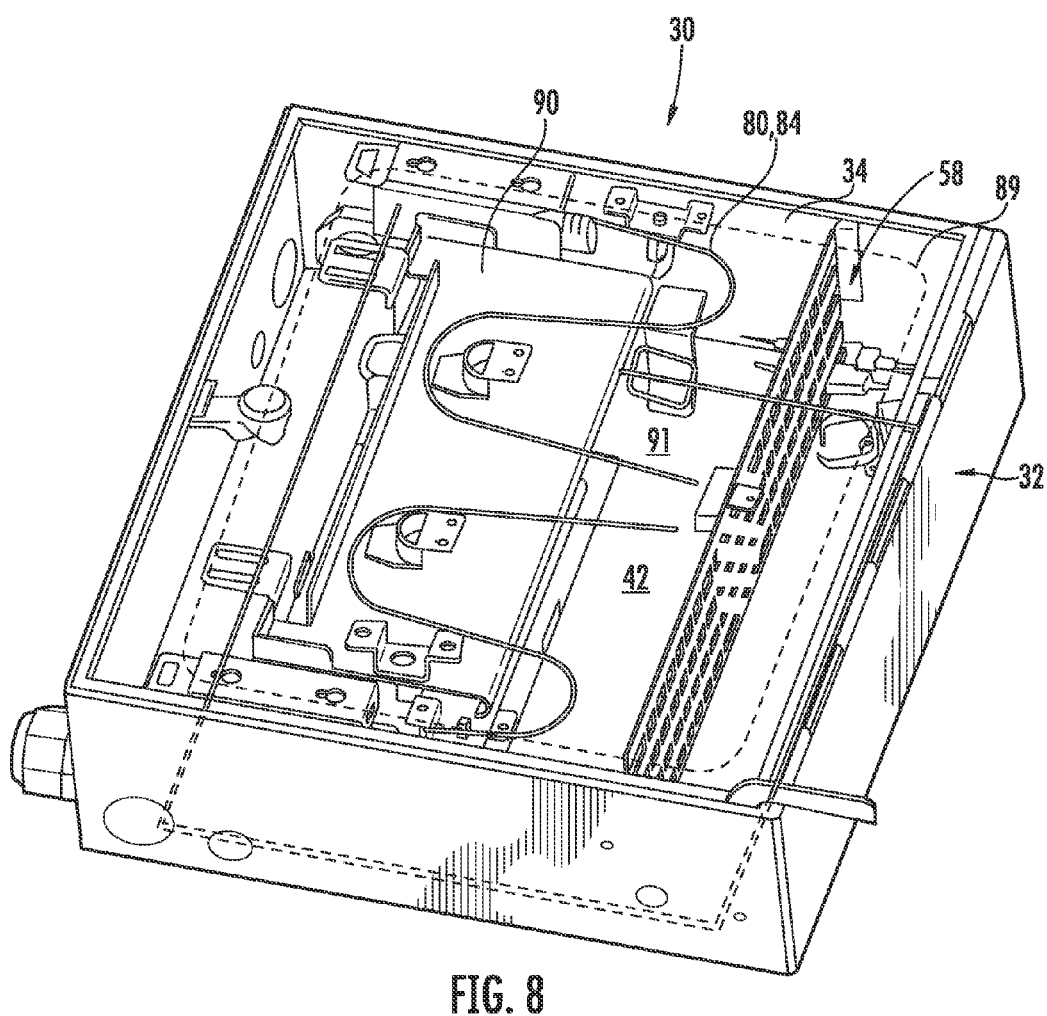
FIG. 8 illustrates the fiber optic terminal of FIG. 2 with the terminal cover closed and shown in transparent form to illustrate the fiber optic connection panel disposed within an optical fiber perimeter within the fiber optic terminal.

As illustrated in FIG. 8, the fiber optic terminal 30 is shown with the terminal cover 34 closed onto the base 32. The terminal cover 34 is shown in transparent form so that the interior chamber 42 of the fiber optic terminal 30 with its optical fibers and optical components can be seen for discussion purposes. Because the optical fibers are routed in the interior chamber 42 around the optical fiber perimeter 89, as illustrated in FIGS. 5 and 6, the fiber optic connection panel 58 can be disposed in the interior area 91 of the base 32 when the terminal cover 34 is closed without or substantially without interference from routed optical fibers in this embodiment. In this same regard, the optical splitters 82 illustrated in FIGS. 5 and 6, or any other optical components, can also be disposed in the interior area 91 of the base 32. This configuration may allow a greater capacity of subscribers to be serviced by the fiber optic terminal 30 for its given size and/or to allow slack storage of network-side and/or subscriber-side optical fibers 54, 56.

Figure 9:
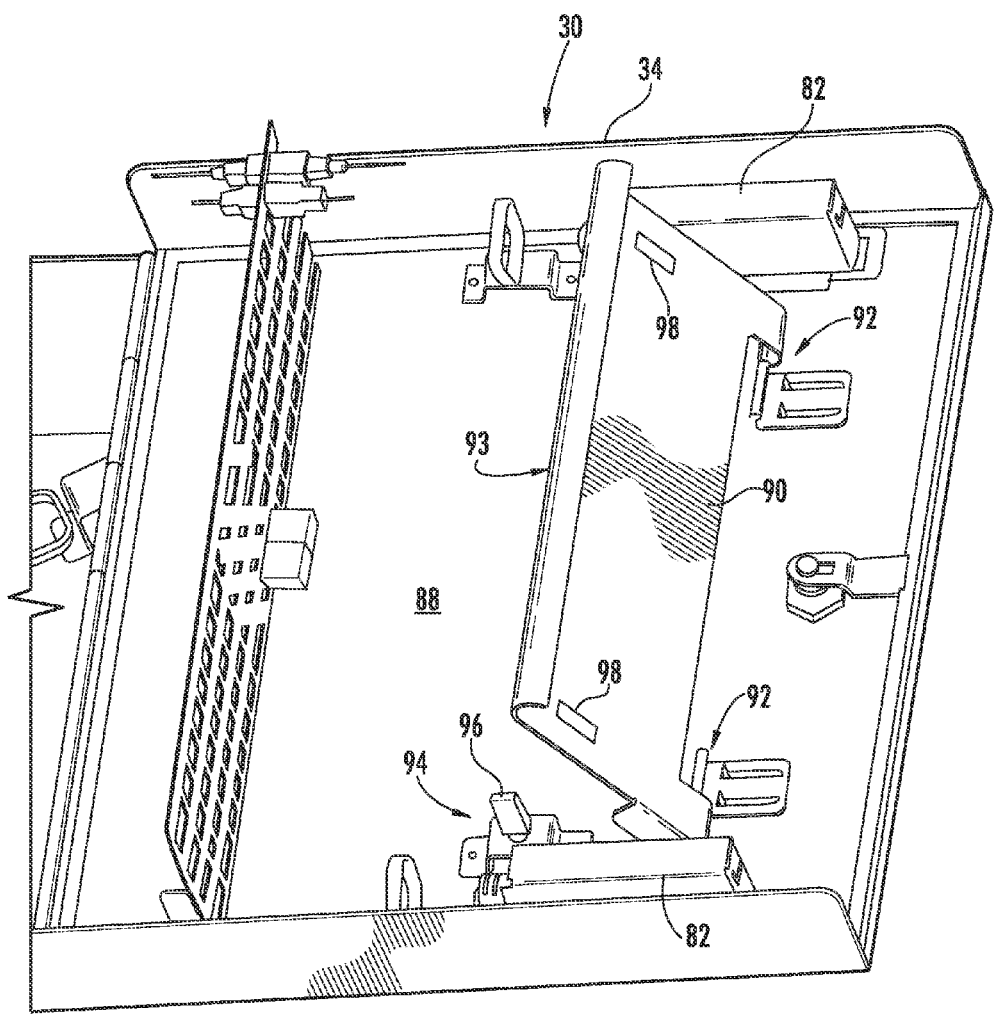
FIG. 9 illustrates the fiber optic terminal of FIG. 2 with an exemplary optical fiber cover disposed in the inside of the terminal cover and opened.
Figure 10:
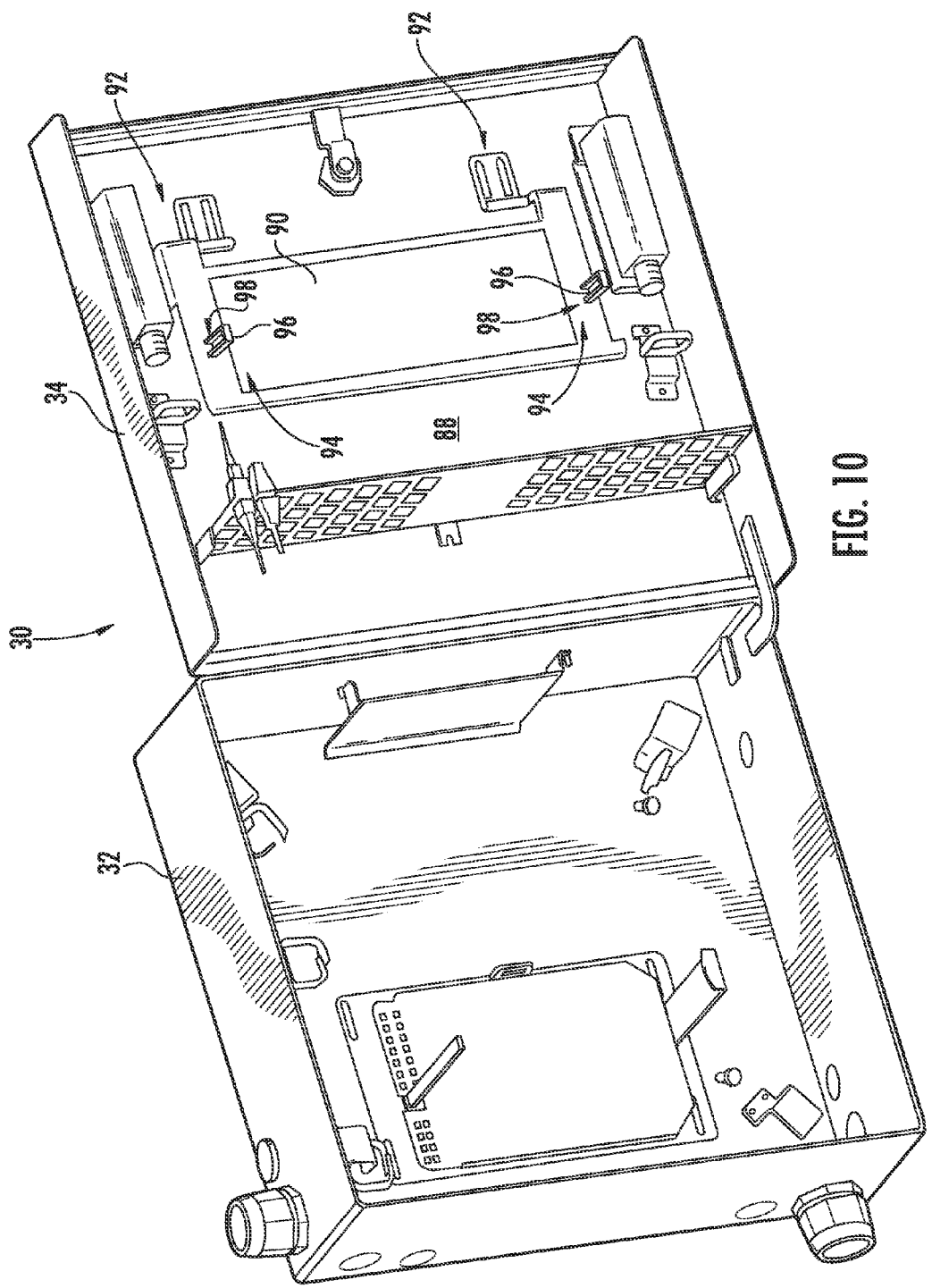
FIG. 10 illustrates the fiber optic terminal of FIG. 2 with the optical fiber cover illustrated in FIG. 9 closed.

FIG. 9 illustrates an optional optical fiber cover 90 that may be disposed in the fiber optic terminal 30. The optical fiber cover 90 in this embodiment is configured to contain or hold the input and/or output fibers 80, 84 (see FIGS. 5 and 6) underneath the optical fiber cover 90. In this regard, the optical fiber cover 90 may prevent or reduce the possibility of the input and/or output fibers 80, 84 from interfering into the splice tray 74 when the terminal cover 34 is closed. In this regard, FIGS. 9 and 10 illustrate more detail regarding the optical fiber cover 90. FIG. 9 illustrates the fiber optic terminal 30 and terminal cover 34 with the optical fiber cover 90 opened. FIG. 10 illustrates the fiber optic terminal 30 and terminal cover 34 with the optical fiber cover 90 closed.

With reference to FIG. 9, the optical fiber cover 90 may be opened when fiber optic connections are being made between input and output fibers 80, 84 (see FIGS. 5 and 6) from the optical splitters 82 and the input and output fiber optic adapters 62, 64 disposed in the fiber optic connection panel 58. The optical fiber cover 90 is configured to allow input and output fibers 80, 84 to be retained down towards the inside surface 88 of the terminal cover 34 so that the input and output fibers 80, 84 do not interfere with any other fibers or optical components when the terminal cover 34 is closed onto the base 32. This may prevent bending or kinking of the input and output fibers 80, 84. The optical fiber cover 90 in this embodiment is attached to the inside surface 88 of the terminal cover 34 via hinges 92 so that the optical fiber cover 90 can be opened and rotated about the hinges 92. Alternatively, the optical fiber cover 90 could be configured to be completely removed and reattached to the terminal cover 34 when fiber routing is completed. The optical fiber cover 90 in this embodiment also includes a curled or lip section 93 that provides a handle to allow a technician to easily open the optical fiber cover 90.

After fiber routing is completed, the optical fiber cover 90 can be closed, as illustrated in FIG. 10. The optical fiber cover 90 can be closed and secured by locking mechanisms 94, as illustrated in FIGS. 9 and 10. In this embodiment, the locking mechanism 94 is provided in the form of inward biased latches 96 that are designed to engage and be disposed through latch orifices 98 disposed in the optical fiber cover 90, as illustrated in FIGS. 9 and 10. When it is desired to open the optical fiber cover 90, the latches 96 are pushed inward so that the latches 96 can be released from the latch orifices 98. When the optical fiber cover 90 is to be closed and secured, the optical fiber cover 90 is rotated about the hinges 92 towards the inside surface 88 of the terminal cover 34 wherein the latches 96 will engage the latch orifices 98. By the latches 96 being inwardly biased, the latches 96 will move inward as they pass through the latch orifices 98 until the latches 96 clear the latch orifices 98.

The fiber optic terminal 30 may be installed in any location or premises. The fiber optic terminal 30 described herein may be particularly suited for multi-dwelling units (MDUs), because the fiber optic terminal 30 is capable of providing high density optical connections between a network-side fiber optic cable(s) and a subscriber-side fiber optic cable. Further, the fiber optic terminal 30 may be configured as either an LCP or an FDT. In this regard, FIG. 11 illustrates the fiber optic terminal 30 provided as both LCPs and FDTs installed in an MDU 100. The MDU 100 may comprise an apartment building having nine (9) dwelling units 102 for illustrative purposes only. The fiber optic terminal 30, configured as an LCP 104, is positioned on the ground floor or basement in the illustrated embodiment; however, the LCP of further embodiments can be positioned at any location relative to the MDU. The LCP 104 includes a cable assembly 106 that is optically connected to a network-side fiber optic cable 50, as described above. The network-side fiber optic cable 50 may be optically connected to a fiber optic network 117. As also described above, one or more subscriber-side fiber optic cables 52 carrying optical signals to and from the fiber optic network 117 can be connected to the LCP 104, and exit the LCP 104 and extend throughout the MDU 100. The subscriber-side fiber optic cables 52 carry optical signals to and from the LCP 104 and extend directly to each dwelling unit via subscriber-side optical fibers or fiber optic cables 110 and eventually terminate at a subscriber termination point 108, such as an adapter in a wall outlet, an adapter in a floor panel, an adapter behind a ceiling tile, or the like such that the subscriber can optically connect to a subscriber-side optical fiber 110.

The subscriber-side optical fibers 110 can be directly from optical fibers from the subscriber-side fiber optic cable 52, or can be provided from one or more intermediate fiber optic terminals 30 configured as FDTs 112. FDTs 112 can be provided to simplify the routing and installation of the optical fibers between the LCP 104 and the subscriber termination points 108 by allowing the subscriber-side optical fibers 110 to be grouped between the LCP 104 and FDTs 112 and then separated at the FDTs 112. The FDTs 112 are configured to receive the subscriber-side fiber optic cables 52 and provide the individual subscriber-side optical fibers 110 to the subscriber termination points 108. Accordingly, there are fewer optical fibers and/or fiber optic cables extending between the floors of the MDU 100, thus simplifying routing of optical fibers through the MDU 100. Although floors of an MDU 100 are described in the illustrated embodiments, it should be appreciated that FDTs 112 may be used to facilitate optical fiber routing to any layout of areas within an MDU 100.

Further, although the subscriber-side optical fibers 110 and subscriber-side fiber optic cables 52 include arrows pointing in the direction of the subscriber termination points 108, it should be appreciated that optical signals may be passed in either direction as required for the particular application; the arrows are merely provided for illustrative purposes.

As used herein, the term "fiber optic terminal" is intended to include any type of fiber optic terminal. For example, the fiber optic terminal as used herein can be a splice terminal, patch terminal or the like, or any combination thereof. The adapter panels provided in one or more adapter modules in a fiber optic terminal are not limited to provide fiber optic adapters. If fiber optic adapters are provided, the fiber optic adapters may be for any type of optical connector, including but not limited to an LC, SC, MTP, FC, ST, MU, or MTRJ, without limitation.

The fiber optic terminals disclosed herein may be used for any fiber optic distribution application, including but not limited to directly or intermediately routing fiber optic cables and optical fibers from a fiber optic network(s) to end subscribers, including but not limited to various fiber-to-the-premises (FTTP), fiber-to-the-home (FTTH), and other fiber initiatives (generally described as FTTx). Subscriber premises include, but are not limited to single-dwelling units (SDU), multi-dwelling units (MDU), businesses, and/or other facilities or buildings.

The fiber optic terminals may be installed in any location, including an aerial location, buried, or disposed in a larger enclosure, such as a ground pedestal. The network-side and subscriber-side fiber optic cables may be any type of fiber optic cable and include any type of optical fibers in any form. The terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated. Additionally, the optical fibers may have various diameters, including for example only, diameters of 900 micrometers (μm), 2.0 millimeters (mm) and 3.0 mm. Further, the optical fibers may be included in a flat cable. An example of a flat cable is a pixian cable.

Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A fiber optic terminal, comprising:
   a base defining an interior chamber configured to receive at least one network-side optical fiber and a plurality of subscriber-side optical fibers;
   a plurality of fiber routing guides disposed in the base defining an optical fiber perimeter in the interior chamber of the base;
   a terminal cover configured to close onto the base; and
   at least one fiber optic connection panel disposed on an inside surface of the terminal cover and configured to be disposed within the optical fiber perimeter when the terminal cover is closed onto the base.

2. The fiber optic terminal of claim 1, wherein the plurality of fiber routing guides are configured to route the at least one network-side optical fiber and/or the plurality of subscriber-side optical fibers.

3. The fiber optic terminal of claim 1, wherein the at least one network-side optical fiber is provided in a network-side fiber optic cable, and the plurality of subscriber-side optical fibers are provided in a subscriber-side fiber optic cable.

4. The fiber optic terminal of claim 1, wherein the fiber optic terminal is a terminal comprised from the group consisting of a fiber distribution terminal (FDT) and a local convergence point (LCP).

5. The fiber optic terminal of claim 1, wherein the at least one fiber optic connection panel is configured to support at least one fiber optic adapter configured to receive and connect connectorized optical fibers together.

6. The fiber optic terminal of claim 1, further comprising:
   at least one network-side splice configured to splice the at least one network-side optical fiber into at least one input pigtail;
   wherein the at least one input pigtail is configured to optically connect to an input fiber optic adapter disposed in the at least one fiber optic connection panel.

7. The fiber optic terminal of claim 1, further comprising:
   a plurality of subscriber-side splices configured to splice one or more of the plurality of subscriber-side optical fibers into a plurality of output pigtails;
   wherein the plurality of output pigtails are configured to optically connect to one or more of a plurality of output fiber optic adapters disposed in the at least one fiber optic connection panel.

8. The fiber optic terminal of claim 1, further comprising at least one optical splitter disposed on the inside surface of the terminal cover.

9. The fiber optic terminal of claim 8, wherein the at least one optical splitter is configured to be disposed within the optical fiber perimeter when the terminal cover is closed onto the base.

10. The fiber optic terminal of claim 8, wherein the at least one optical splitter is configured to split an input optical signal carried by the at least one network-side optical fiber into output signals configured to be carried on one or more of the plurality of subscriber-side optical fibers.

11. The fiber optic terminal of claim 1, wherein the at least one fiber optic connection panel defines a fiber parking area for one or more optical fibers.

12. The fiber optic terminal of claim 1, further comprising an optical fiber cover disposed on the inside surface of the terminal cover adjacent to the at least one fiber optic connection panel.

13. The fiber optic terminal of claim 12, wherein the optical fiber cover is hingedly attached to the inside surface of the terminal cover to be configured to be opened and closed about the inside surface.

14. The fiber optic terminal of claim 13, wherein the optical fiber cover is configured to secure one or more optical fibers connected to the at least one fiber optic connection panel adjacent to the inside surface.

15. The fiber optic terminal of claim 13, further comprising at least one releasable latch disposed in the inside surface of the terminal cover and configured to releasably secure the optical fiber cover parallel to the inside surface of the base.

16. The fiber optic terminal of claim 1, further comprising at least one limiting member disposed between the base and the terminal cover to limit the opening of the terminal cover about the base.

17. A method for optically connecting a subscriber-side optical fiber to a fiber optic network, comprising:
    providing a fiber optic terminal comprising:
      a base defining an interior chamber configured to receive at least one network-side optical fiber and a plurality of subscriber-side optical fibers;

a plurality of fiber routing guides disposed in the base defining an optical fiber perimeter in the interior chamber of the base;

a terminal cover configured to close onto the base; and at least one fiber optic connection panel disposed on an inside surface of the terminal cover;

providing at least one network-side optical fiber into the fiber optic terminal;

providing a plurality of subscriber-side optical fibers into the fiber optic terminal;

optically connecting the at least one network-side optical fiber to at least one input fiber optic adapter disposed in the at least one fiber optic connection panel;

optically connecting one or more of the plurality of subscriber-side optical fibers to one or more of a plurality of output fiber optic adapters disposed in the at least one fiber optic connection panel; and disposing the at least one fiber optic connection panel within the optical fiber perimeter by closing the terminal cover onto the base.

18. The method of claim 17, further comprising routing the at least one network-side optical fiber and/or the plurality of subscriber-side optical fibers in the plurality of fiber routing guides.

19. The method of claim 17, further comprising routing the plurality of subscriber-side optical fibers around the plurality of fiber routing guides.

20. The method of claim 17, wherein the fiber optic terminal further comprises at least one optical splitter configured to split an input fiber into a plurality of output fibers.

21. The method of claim 20, further comprising disposing the at least one optical splitter within the optical fiber perimeter by closing the terminal cover onto the base.

22. The method of claim 20, further comprising optically connecting the input fiber to the at least one input fiber optic adapter and optically connecting one or more of the plurality of output fibers to one or more of the plurality of output fiber optic adapters to optically connect the at least one network-side optical fiber to one or more of the plurality of subscriber-side optical fibers.

23. The method of claim 22, wherein optically connecting the at least one network-side optical fiber to the at least one input fiber optic adapter, comprises:

splicing the at least one network-side optical fiber into at least one input pigtail; and optically connecting the at least one input pigtail to the at least one input fiber optic adapter.

24. The method of claim 22, wherein optically connecting the one or more of the plurality of subscriber-side optical fibers to one or more of the plurality of output fiber optic adapters comprises:

splicing one or more of the plurality of subscriber-side optical fibers into one or more output pigtails; and optically connecting the one or more output pigtails to one or more of the plurality of output fiber optic adapters.

25. The method of claim 22, wherein providing the at least one network-side optical fiber into the fiber optic terminal comprises providing the at least one network-side optical fiber into the interior chamber of the base.

26. The method of claim 22, wherein providing the plurality of subscriber-side optical fibers into the fiber optic terminal comprises providing the plurality of subscriber-side optical fibers into the interior chamber of the base.

27. The method of claim 17, further comprising providing one or more of the subscriber-side optical fibers in a fiber parking area disposed in the at least one fiber optic connection panel.

28. A fiber optic terminal, comprising:

a base defining an interior chamber configured to receive at least one network-side optical fiber and a plurality of subscriber-side optical fibers;

a plurality of fiber routing guides disposed around at least three sides of the base and defining an optical fiber perimeter in the interior chamber of the base, and configured to route the plurality of subscriber-side optical fibers;

a terminal cover configured to close onto the base;

at least one fiber optic connection panel disposed on an inside surface of the terminal cover and containing at least one input fiber optic adapter receiving a connectorized end of an input pigtail spliced to the at least one network-side optical fiber and a plurality of output fiber optic adapters receiving connectorized ends of output pigtails spliced to the plurality of subscriber-side optical fibers; and at least one optical splitter disposed on the inside surface of the terminal cover and configured to split an optical signal received over at least one input fiber connected to the at least one input fiber optic adapter to a plurality of output fibers connected to the plurality of output fiber optic adapters to connect the at least one network-side optical fiber to the plurality of subscriber-side optical fibers;

wherein the at least one fiber optic connection panel is configured to be disposed inside the optical fiber perimeter when the terminal cover is closed onto the base.

* * * * *